(12) United States Patent
Nickl et al.

(10) Patent No.: US 11,087,225 B2
(45) Date of Patent: Aug. 10, 2021

(54) SYSTEMS AND METHODS FOR IDENTIFYING COMPLIANCE-RELATED INFORMATION ASSOCIATED WITH DATA BREACH EVENTS

(71) Applicant: Canopy Software Inc., Reston, VA (US)

(72) Inventors: Ralph Nickl, Reston, VA (US); Oran Sears, Reston, VA (US)

(73) Assignee: Canopy Software, Inc., Reston, VA (US)

( * ) Notice: Subject to any disclaimer, the term of this patent is extended or adjusted under 35 U.S.C. 154(b) by 0 days.

(21) Appl. No.: 17/079,937

(22) Filed: Oct. 26, 2020

(65) Prior Publication Data

US 2021/0125089 A1    Apr. 29, 2021

Related U.S. Application Data

(63) Continuation of application No. PCT/US2020/057245, filed on Oct. 24, 2020.

(60) Provisional application No. 62/925,569, filed on Oct. 24, 2019, provisional application No. 62/925,569, filed on Oct. 24, 2019.

(51) Int. Cl.
  *G06N 5/04* (2006.01)
  *H04L 29/06* (2006.01)
  *G06N 20/00* (2019.01)

(52) U.S. Cl.
  CPC .............. *G06N 5/04* (2013.01); *G06N 20/00* (2019.01); *H04L 63/14* (2013.01)

(58) Field of Classification Search
  USPC .......................................................... 706/12
  See application file for complete search history.

(56) References Cited

U.S. PATENT DOCUMENTS

| | | | |
|---|---|---|---|
| 2014/0089039 A1 | 3/2014 | McClellan | |
| 2014/0142988 A1* | 5/2014 | Grosso | G06Q 10/10 705/4 |
| 2016/0224904 A1 | 8/2016 | Chanchalani | |
| 2017/0193249 A1* | 7/2017 | Luria | G06F 21/604 |
| 2017/0206376 A1* | 7/2017 | Sher-Jan | H04L 63/1433 |
| 2017/0337379 A1* | 11/2017 | Johar | G06F 21/552 |
| 2019/0108594 A1* | 4/2019 | Guzman | G06F 16/5846 |

OTHER PUBLICATIONS

International Search Report for PCT/US20/57245 dated Feb. 3, 2021.

* cited by examiner

*Primary Examiner* — Michael B Holmes
(74) *Attorney, Agent, or Firm* — Thomas | Horstemeyer, LLP

(57) ABSTRACT

Various examples are provided related to identification and management of compliance-related information associated with data breach events. In one example, a method includes receiving a first data file collection associated with a first data breach event; generating information associated with presence or absence of protected information elements of all or part of the first data file collection and incorporating data files including the protected information elements in a second data file collection; analyzing data files selected from the second data file collection; and incorporating the information associated with the analysis into machine learning information that may be used for subsequent analysis of data file collections.

21 Claims, 17 Drawing Sheets

PII

Check all that apply:
- ☐ Account Number AND Password
- ☐ Account Password
- ☐ Alien Registration Number
- ☐ Automated License Plate Recognition
- ☐ Bank Account Number
- ☐ Bank Name

PHI

Check all that apply:
- ☐ A - Patient, Family, or Provider Name
- ☐ B - Geographic Identifiers
- ☐ C - Dates related to individual
- ☐ D - Phone Numbers
- ☐ Diagnosis

Add Entities

First Name

Middle Name

Last Name

Suffix

Address

[SAVE] [SAVE + ADD] [CANCEL]

SYSTEMS AND METHODS FOR IDENTIFYING COMPLIANCE-RELATED INFORMATION ASSOCIATED WITH DATA BREACH EVENTS

CROSS-REFERENCE TO RELATED APPLICATIONS

This application claims priority to U.S. Provisional Application No. 62/925,569, filed Oct. 24, 2019. This application is a continuation of International Application No. PCT/US2020/057245, filed Oct. 24, 2020, which claims priority to U.S. Provisional Application No. 62/925,569, filed Oct. 24, 2019, both of which are hereby incorporated by reference in their entireties.

FIELD OF THE DISCLOSURE

The present disclosure relates to systems and methods for identification and management of compliance-related information associated with data breach events.

BACKGROUND OF THE DISCLOSURE

According to Statista.com, in 2019, 1,473 data breaches were reported in the United States, which exposed over 164.68 million sensitive records. In the first half of 2020, 540 data breaches were reported. As would be appreciated, a data breach occurs when a cybercriminal (a/k/a "hacker") exfiltrates private data from a network, device, or system. This can be done by the hacker's accessing of a computer or a device to expropriate stored thereon or by bypassing network security remotely to gain access to the data files stored in or associated with the network. While most reported data breaches can be attributed to hacking or malware attacks by third parties with nefarious intentions, other breaches can be attributed to insider leaks, payment card fraud, loss or theft of a physical hard drive of files, and human error. Data breaches can be quite expensive to organizations that own or are responsible for the data involved in the data breach event. Costs associated with addressing data breaches typically include tangible costs related to regulatory compliance (e.g., notification of affected individuals/organizations/regulatory agencies), remediation (e.g., repairing/hardening the network, providing security to affected individuals/organization), and liability payments (e.g., damages paid to affected individuals/organizations, penalties/penalties paid to regulatory agencies) investigation. Indirect costs (reputational damages, providing cyber security to victims of compromised data, etc.) often also result.

The subject matters of data files involved in data breaches will vary according to the business use case for the enterprise IT network that is breached by the data hack. To this end, data breach events may be associated with personal or company financial information such as credit card or bank details, an individual's personal health information ("PHI"), an individual's personally identifiable information ("PI"), or intellectual property, among other things.

A familiar example of a data breach is when a hacker gains unauthorized access into a corporate network and exfiltrates sensitive data out of one or more databases accessible via the hacker's point of entry. However, not all breaches are associated with bad intent. If an unauthorized hospital employee views a patient's health information on a computer screen over the shoulder of an authorized employee, that also constitutes a data breach as defined by the regulatory frameworks associated with private health information.

Data breaches can occur when employees use weak passwords, when known software errors are exploited and when computers and mobile devices that are associated with a network are lost or stolen. Users' connections to rogue wireless networks that capture login credentials or other sensitive information in transit can also lead to unauthorized exposures. Social engineering—especially attacks carried out via email phishing—can lead to users providing their login credentials directly to attackers or through subsequent malware infections. Criminals can then use the credentials they obtained to gain entry to sensitive systems and records—access which often can go undetected for months, or even indefinitely. Threat actors can also target third-party business partners in order to gain access to large organizations; such incidents typically involve hackers compromising less secure businesses to obtain access to the primary target on which networks valuable information resides.

In the US, there is no comprehensive federal law that regulates the rights of data owners and the attendant obligations of those organizations or enterprises that are fully or partly responsible for a data breach. A wide variety of industry guidelines and government compliance regulations mandate strict control of sensitive data types with a goal of preventing unauthorized access thereto that constitutes a data breach. Within a corporate environment, for example, the Payment Card Industry Data Security Standard ("PC-IDSS") defines who may handle and use PII, such as credit card numbers when available in conjunction with the cardholders' names and addresses. Within a healthcare environment, the Health Insurance Portability and Accountability Act ("HIPAA") regulates who may see and use PHI, such as a patient's name, date of birth, and healthcare diagnoses and treatments. There are also specific requirements for the reporting of data breaches via HIPAA—and its Health Information Technology for Economic and Clinical Health (HITECH) Act and Omnibus Rule—as well as the various state breach notification laws. The consequences of intellectual property data breaches can lead to significant legal disputes, as well as business losses if the breach is made public.

In the absence of comprehensive US federal government regulation, many states have enacted data breach notification laws that require both private and public entities to notify individuals, whether customers, consumers or users, of breaches involving certain types of data, such as PII. The deadline to notify individuals affected by breaches can vary from state to state, and the specific notification requirements of each jurisdiction can differ markedly, thus making it somewhat onerous for those bearing compliance-related responsibilities associated with data breaches to meet their notification obligations. This is especially true since most companies that are susceptible to data breaches engage in internet commerce, which means that their customers should be considered to be located in each of the 50 states. It follows that it may be necessary to perform individualized compliance activities for every state and, as such, compliance with the various regulatory obligations associated with a single data breach event can be quite complex. Moreover, given the short time deadlines associated with some of the jurisdictions (e.g., Colorado and Florida have 30 day provisions), time is of the essence in identifying those affected by a data breach and determining the nature and content of the data that may have been associated with the data breach.

In the US, the California Consumer Privacy Act ("CCPA") came into effect in early 2020. This law is the most stringent in the US today and since many, if not most, companies that transact business in the US will likely interact with California residents, the provisions of this law are of intense interest. Broadly, the CCPA gives consumers more control over the personal information that businesses collect about them by providing persons with a number of rights:

the right to know about the personal information a business collects about them and how it is used and shared;
the right to delete personal information collected from them (with some exceptions);
the right to opt-out of the sale of their personal information; and
the right to non-discrimination for exercising their CCPA rights.

The California Consumer Privacy Act ("CCPA") (A.B. 375) is applicable to for-profit businesses that collect and control California residents' personal information, do business in the state of California, and meet at least one of the following thresholds:

Annual gross revenues larger than $25 million;
Receive or disclose the personal information of 50,000 or more California residents, households, or devices each year; or
Make 50 percent or greater annual revenue from selling California residents' personal information.

Outside of the US, other various regulatory frameworks exist for data protection and deadlines for notification of affected persons, as well as for penalties for non-compliance with data privacy mandates. The most well-known, and likely the one of the most important in this modern world of global commerce, is the European Union General Data Protection Regulation ("GDPR"). The GDPR not only applies to organizations located within the EU but also applies to organizations located outside of the EU if they offer goods or services to, or monitor the behavior of, EU data subjects, that is, persons. In addition to data breach notifications, organizations that collect personal data from individuals must take affirmative steps to ensure that internal checks are placed on access to private information. Thus, GDPR requires internal audits to ensure that only authorized persons are allowed to access private information.

Notification requirements of the GDPR are strict. Companies are required companies to notify all data subjects that a security breach has occurred within 72 hours of first discovery of the breach. The method of this notification includes as many forms as deemed necessary to disseminate the information in a timely manner, including email, telephone message, and public announcement. This requires immediate action to process the scope and content of the data breach by an enterprise that discovers that a data breach has occurred. Penalties for non-compliance with the GDPR can be severe: enterprises found to be in violation of the provisions of the GDPR can be fined up to 4% of annual global turnover or 20 Million Euros, whichever is greater. Other violations are assessed on a tiered basis depending on the infraction. For example, a company can be fined 2% for not having its records in order, not notifying the supervising authority and the data subject about a security breach in a timely manner, or for not conducting a required impact assessment of a security breach.

While it may at first not seem to be a difficult problem to provide the required notifications to affected persons after a data breach notification, in practice, the task is daunting in most situations. Since most data breach events involve large numbers of data files and time periods for notification can be short in relevant locations/jurisdictions (e.g., EU, Colorado, Florida), time will nonetheless be of the essence even while the tasks required for compliance may be complex. The amount of information that must be reviewed after a data breach notification can be expansive. For example, during a routine audit, an enterprise IT network administrator can determine that an unauthorized forwarding rule was unknowingly applied three years previously and that that five employee mailboxes were compromised for that entire time. Compliance with applicable laws, rules, regulations, policies, or contractual obligations will require a human review team, for example an outside law firm, to determine the nature of the compromised data in order to provide the necessary notifications to affected parties and regulatory bodies, as well as to determine potential liability for the breach.

Review of data involved in data breach events has largely remained a manual task for human reviewers because the vast majority of data-some estimates say 80%-maintained in businesses today comprises some form of unstructured data (e.g., documents, spreadsheets, emails, presentations, audio and video, web searches, images, and social media posts, handwritten notes) that does not readily lend itself to accurate automated review and identification using prior art methodologies. Of course, unstructured data is just as likely to include or be associated with personally identifiable information or other regulated information types that are protected from unauthorized disclosure in context. Thus, the insights and intelligence of humans has been required to conduct meaningful and suitably accurate review of such information in order to ensure that each data file is examined in the context of compliance obligations.

To this end, existing methods used to identify the scope and content of a data breach typically involves a team of human reviewers who each individually review a subset of the overall dataset of interest. Each person will create an individual database (e.g., a spreadsheet). While the review team can be provided with guidelines as to the subject matter of the review and the form of the database preparation, in practice, each reviewer will introduce subjectivity into their database preparation. This can, in turn, lead to missed information that will never be included in the final work product, which can give rise to liability if an audit reveals such mistakes. Even assuming that the human reviewers' work is substantially free of errors, current methods require manual data entry by the reviewers to create each individual spreadsheet. Each reviewer will have her own way of assessing the data, especially when relevant data may occur in different forms in different datasets. When the review of the entire dataset that is the subject of the data breach event is completely reviewed, a Quality Assurance ("QA") person or group of individuals must perform the task of merging each individual database to remove duplicate individuals and to ensure the entered data is correct. In many cases, the task of generating a compliance-related database within the mandated deadlines cannot be met even with a large team of human reviewers.

While it might be expected that some of the data review could be automated in order to accelerate the review, in practice, this has not been possible for a number of reasons. First, the laws and regulations may not include "safe harbor" provisions that will excuse missed notifications. Rather, the laws and regulations are generally based on the understanding that every individual affected by a data breach may experience harm from that breach. If a person is not identified, or if not all of the breached information is identified for that person, the person will not be able to take affirmative steps to protect herself and that person may not be included in any remedies provided to affected parties. Existing data review methodologies are not able to automatically process the wide variety of data that may be present in data breach events, especially since much of the data generated in each organization will be "bespoke" or "customized" to the use cases and according to the preferences of businesses or that of individual employees. Moreover, many of the data files in a data breach event will be in forms that are not readily processable by automated document review systems. In this regard, image data may contain PII, such as driver's licenses images that are acquired as customer identification. When such image data files are included in a data breach event, the persons whose driver's license is included in the breached data files, which will include a plurality of elements of personal data (i.e., full name, driver's license number, date of birth, sex, height, and address) will have to be notified by the network owner or manager of the disclosure of her data.

Of course, the person cannot be notified of the data breach until all relevant data is identified and manually entered into a database where all information belonging to her is linked as a group. If there is a large number of image files in the database, the amount of staffing and/or time needed to review the files and to manually extract and link all of the relevant information can exceed the deadlines set out for notification of the breach, especially when short notification times are mandated. For example, it could be physically impossible to marshal the resources needed to comply with the notification deadlines mandated by the GDPR of 72 hours from notification of the breach. Even with longer turnaround times for notification, the sheer amount of data that needs to be reviewed, identified, and linked can make error-free notification database preparation difficult, if not impossible using manual review methods that integrate the work product of multiple human reviewers. And since error-free notifications are required, current methodologies cannot allow compliance with notification rules to be ensured.

There remains a need for improvements in the ability to prepare compliance-related databases associated with notifications of parties affected by a data breach as are required by one or more laws, rules, regulations, policies, or contractual obligations. The present disclosure provides these and other benefits.

SUMMARY OF THE DISCLOSURE

Aspects of the present disclosure are related to identification and management of compliance-related information associated with data breach events. In one aspect, among others, a method of managing compliance-related activities after a data breach associated with an enterprise IT network comprises receiving, by at least one computer, a first data file collection associated with a first data breach event. The first data file collection can be generated by analysis of the first data breach event and derived from a bulk data file collection stored on or associated with a first enterprise IT network of interest for monitoring for an occurrence of data breach events; the first data file collection can comprise at least some of structured, unstructured, and semi-structured data file types; and at least some of the first data file collection can comprise protected information having compliance-related activities associated therewith. The method further comprises generating, by the at least one computer, information associated with presence or absence of protected information elements of all or part of the first data file collection and, if the generated information indicates that a data file in the first data file collection includes the protected information elements, incorporating that data file in a second data file collection; analyzing, by at least one human reviewer, a subset of individual data files selected from the second data file collection to validate that each data file in the subset of individual data files comprises one or more of the protected information elements; and incorporating, by the at least one computer, the information associated with the analysis of the subset of individual data files into machine learning information configured for subsequent analysis of either or both of the first and second data file collections. If it is determined that the one or more protected information elements are not present in a data file, that data file can be removed, by the at least one human reviewer, from the second data file collection and re-incorporating that data file into the first data file collection; or if it is determined that the one or more protected information elements are present in a data file: at least one entity identification can be derived, by either or both of the at least one human reviewer or the at least one computer, for an entity associated with each of the one or more protected information elements in that data file, wherein the entity comprises an individual, a group of individuals, an organization, or a company; and information associated with each of the one or more protected information elements and the associated entity can be generated by either or both of the at least one human reviewer or the at least one computer.

In various aspects, the unstructured data file type in the first data file collection can comprise image files. The method can further comprise selecting, by the at least one computer, a subset of image files from either or both of the first and second data file collections; configuring, by the at least one computer, the subset of image files for display and selection on a user device associated with the at least one human reviewer; displaying, by the at least one computer, a plurality of the image files from the subset of image files on the user device; selecting, by the at least one human reviewer, a displayed image when the at least one human reviewer identifies that the displayed image is associated with the one or more protected information elements; and recording, by the at least one computer, information associated with the at least one human reviewer's selection of the displayed image, thereby providing identification information for the presence or absence of the one or more protected information elements in at least some image files in the subset of image files selected from either or both of the first and second data file collections. The method can further comprise incorporating, by the at least one computer, the identification information into machine learning training information; and analyzing, by the at least one computer, image files in the first and second data file collections for the presence of the one or more protected information elements.

In one or more aspects, the method can further comprise identifying, by the at least one computer, some or all of the one or more protected information elements and the at least one entity identification in the image files; and extracting, by the at least one computer, the identified protected information elements and the at least one entity identification from the image files for incorporation in a database. The method can further comprise recording, by the at least one computer, information associated with the analysis by the at least one human reviewer of each of the subset of individual data files in the second collection of data files; and incorporating, by the at least one computer, the at least one human reviewer's analysis information as training information for use in subsequent analysis of one or more of: data files in the first data file collection; data files in the second data file collection that are not included in the subset of individual data files; data files in the subset of individual data files that have not yet been reviewed by the at least one reviewer; a third data file collection derived from a bulk data file collection stored on or associated with the first enterprise IT network, wherein the third data file collection is generated after a second data breach event associated with the first enterprise IT network; or a fourth data file collection derived from a bulk data file collection stored on or associated with a second enterprise IT network that is different from the first enterprise IT network, wherein the fourth data file collection is generated after a data breach event occurring on the second enterprise IT network.

In some aspects, the method can further comprise determining, by the at least one computer, whether one or more second collection data files of the second data file collection are associated with the at least one identified entity and, if other second collection data files are associated with that identified entity, generating linkages between the entity-associated files, thereby providing a linked data file collection linked with one or more entity identifications having the one or more protected information elements associated therewith. Each of the second data file collection can be arranged for display and selection on a display device associated with the at least one human reviewer as one or more of: a plurality of defined categories of the protected information elements; a count of data files comprising the protected information elements; and a count of data file categories comprising the protected information elements. The method can further comprise displaying, by the at least one computer, text summaries extracted from a data file in the second data file collection on a device display of the at least one human reviewer selecting, by the at least one human reviewer, some or all of the highlighted protected information elements and entity identifications, thereby providing human reviewer validation of the protected information elements and entity identifications in the data file; and adding, by the at least one computer, the selected protected information elements and entity identifications to the database. The displayed text summaries can comprise each of a protected information element and an entity identification in the data file; the text summaries can each be provided on the display with highlighting generated by the at least one computer; and the text summaries can be configured to allow the at least one human reviewer to select all or part of each of the protected information element and entity identification.

In various aspects, when the second data file collection is identified by either or both of the at least one human reviewer or the at least one computer as comprising a plurality of protected information elements associated with one or more entity identifications, each of the plurality of protected information elements can be linked to each of the one more entity identifications. The second data file collection can comprise an unstructured data file and the plurality of protected information data elements associated with the one or more entity identifications are included as tabular data in the unstructured data file. The identification of protected information in the first data file collection can be associated with a generated confidence level. When a determination that a data file in the first data file collection meets or exceeds the generated confidence level, that data file can be included in the second data file collection. The compliance-related activities can be defined by one or more of laws, regulations, policies, procedures, and contractual obligations associated with the protected information. The compliance-related activities can comprise one or more of: notifying, by the at least one computer or by a manager of the first enterprise IT network, each identified entity of the protected information associated with that entity that was involved with the first data breach event; and notifying, by the at least one computer or the first enterprise IT network manager, a regulatory authority of the first network breach event and providing the regulatory authority with information associated with the identified entities having the protected information involved in the first data breach event.

In another aspects, a method of managing compliance-related activities after a data breach associated with an enterprise IT network comprises providing, by at least one computer, a machine learning library; receiving, by at least one computer, a third data file collection associated with a second data breach event; and analyzing, by the at least one computer, the data files in the third data file collection to generate a compliance-related database configured for providing notifications associated with the second data breach event. The machine learning library can be generated by receiving, by the at least one computer, a first data file collection associated with a first data breach event; generating, by the at least one computer, information associated with presence or absence of protected information elements of all or part of the first data file collection and, if the generated information indicates that a data file in the first data file collection includes the protected information elements, incorporating that data file in a second data file collection; analyzing, by at least one human reviewer, a subset of individual data files selected from the second data file collection to validate that each data file in the subset of individual data files comprises one or more of the protected information elements; and incorporating, by the at least one computer, the information associated with the analysis of the subset of individual data files into machine learning information configured for subsequent analysis of either or both of the first and second data file collections, the machine learning information stored in the machine learning library. The first data file collection can be generated by analysis of the first data breach event and derived from a bulk data file collection stored on or associated with a first enterprise IT network of interest for monitoring for an occurrence of data breach events; the first data file collection comprises at least some of structured, unstructured, and semi-structured data file types; and at least some of the first data file collection comprises protected information having compliance-related activities associated therewith. If it is determined that the one or more protected information elements are not present in a data file, that data file can be removed, by the at least one human reviewer, from the second data file collection and re-incorporating that data file into the first data file collection; or if it is determined that the one or more protected information elements are present in a data file: at least one entity identification can be derived, by either or both of the at least one human reviewer or the at least one computer, for an entity associated with each of the one or more protected information elements in that data file, wherein the entity comprises an individual, a group of individuals, an organization, or a company; and information associated with each of the one or more protected information elements and the associated entity can be generated by either or both of the at least one human reviewer or the at least one computer.

In one or more aspects, the method can further comprise incorporating at least some human reviewer analysis with the third data file collection analysis. The third data file collection analysis can include identification of the presence or absence of protected information elements in the data files. At least some of the data files in the third data file collection can comprise one or more protected information elements, and the method can further comprise linking, by the at least one computer, some or all of the one or more protected information elements with at least one entity, thereby generating entity identification information linkage information for at least some of the protected information elements in the data files. At least some of the data file types in the third data file collection can comprise image files. The third data file collection can comprise at least some unstructured data files and a plurality of protected information elements associated with the one or more entity identifications can be included as tabular data in the unstructured data file. The compliance-related activities can be defined by one or more of laws, regulations, policies, procedures, and contractual obligations associated with the protected information.

Additional advantages of the disclosure will be set forth in part in the description that follows, and in part will be apparent from the description, or may be learned by practice of the disclosure. The advantages of the disclosure will be realized and attained by means of the elements and combination particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

FIGS. 3A-3M illustrate examples of user interfaces implemented by the system for management of the compliance-related activities, in accordance with various implementations of the present disclosure.

DETAILED DESCRIPTION OF THE DISCLOSURE

Figure 1A:
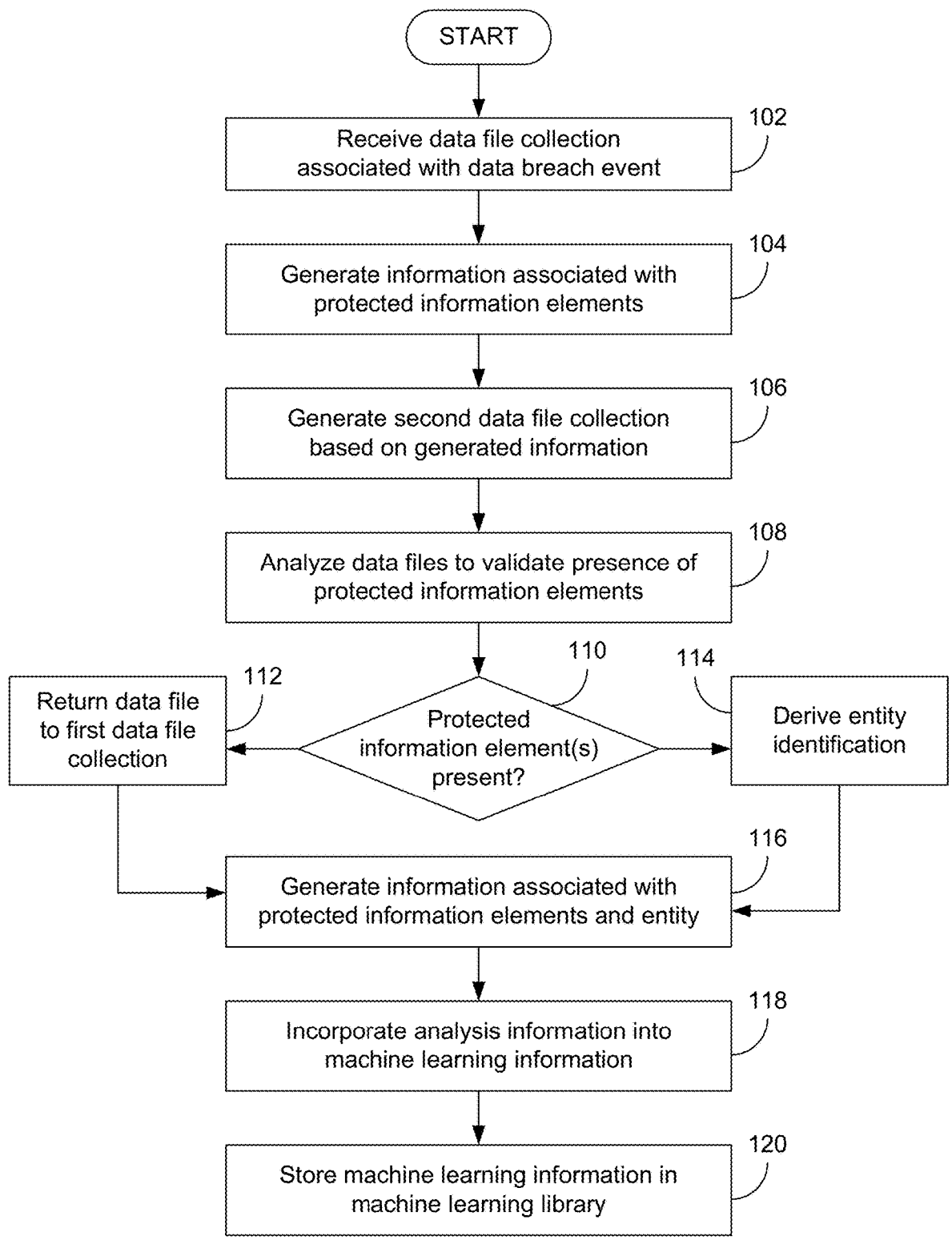
FIGS. 1A and 1B are flow charts illustrating examples of identification and management of compliance-related activities after a data breach associated with an enterprise IT network, in accordance with various implementations of the present disclosure.

In the following detailed description, reference is made to the accompanying drawings, which form a part hereof, and within which are shown by way of illustration certain aspects by which the subject matter of this disclosure may be practiced. It is to be understood that other aspects may be utilized, and structural changes may be made, without departing from the scope of the disclosure. In other words, illustrative aspects and aspects are described below. But it will of course be appreciated that in the development of any such actual implementation, numerous implementation-specific decisions must be made to achieve specific goals, such as compliance with system-related and business-related constraints, which may vary from one implementation to another. Moreover, it will be appreciated that such development effort might be complex and time-consuming but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Wherever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common patent law definition of "comprising" and is therefore interpreted to be an open term meaning "at least the following" and is also interpreted not to exclude additional features, limitations, aspects, etc.

The term "about" is meant to account for variations due to experimental error. All measurements or numbers are implicitly understood to be modified by the word about, even if the measurement or number is not explicitly modified by the word about.

The term "substantially" (or alternatively "effectively") is meant to permit deviations from the descriptive term that do not negatively impact the intended purpose. Descriptive terms are implicitly understood to be modified by the word substantially, even if the term is not explicitly modified by the word "substantially."

An "enterprise IT network" means the components required for the existence, operation and management of an enterprise IT environment, which can be internal to an organization and deployed within owned facilities, such as in an internal corporate IT network. An "enterprise IT network" can also be deployed within a cloud computing system. Still further, an "enterprise IT network" can comprise both internal networks and cloud computing systems, as is increasingly common today. An "enterprise IT network" can also include remote devices (e.g., laptops, cellular phones, medical devices, Internet of Things ("IoT") devices) that are in communications engagement with either or both of an internal IT network or an enterprise cloud computing network.

An "enterprise" can include a company, an organization, a person, or collections thereof. For example, an individual herself can be an "enterprise" (e.g., a doctor in a solo practice), a group of individuals who together form an organization can be an "enterprise" (e.g., a group of doctors in a medical practice), or a group of organizations can together form an "enterprise" (e.g., a group of medical practices that share patient data with each other).

As used herein, "managed data" comprises data that is stored on or associated with a specific enterprise IT network. It is "managed" because such data is under the control or supervision of an enterprise IT department having obligations to maintain the operation and security of such data. The type of managed data contemplated for operation in the systems and methods of the present disclosure are expansive. Classes of managed data can comprise each of "structured data," "unstructured data," and "semi-structured data, as such terms are defined and described in detail hereafter. The forms of managed data will be relevant in the context of the subject enterprise IT network and the business operations conducted by an authorized user of the subject managed data. As would be appreciated, modern business operations typically employ a wide variety of data types in the usual course of operations including, but not limited to:

documents, emails, websites, chat logs, videos, audio recordings, PDFs, and texts, among others.

"Protected information" is a subset of "managed data." "Protected information" comprises any information included in the managed data that is associated with one or more of laws, regulations, policies, procedures, or contractual obligations that define protections and access limitations to the subject matter/content of the respective data files.

To this end, "protected information" can comprise one or more of "personal data" or "personally identifiable information" ("PII") or equivalents thereof as defined in one or more national, state, or local laws that are relevant to a subject data breach. Examples of such laws include:

Gramm-Leach-Bliley Act (GLBA): U.S. financial institutions must disclose how they share customers' information;

Health Insurance Portability and Accountability Act (HIPAA): U.S. health providers must take adequate steps to protect patients' PHI;

Family Educational Rights and Privacy Act (FERPA): U.S. educational institutions must have the consent of students over 18 years old to release records such as schedules, transcripts, and disciplinary information;

Health Information Technology for Economic and Clinical Health (HITECH): Organizations regulated by HIPAA must report data breaches affecting more than 500 people to the affected individuals, the U.S. Department of Health and Human Services, and the media;

California Consumer Privacy Act of 2018 (A.B. 375): provides consumers with certain rights to the use and control of their personal information;

Colorado Data Protection Statute (Colo. Rev. Stat. § 6-1-716): applies to an individual or commercial entity that conducts business in CO and that owns, licenses, or maintains computerized data that includes personal information as defined in the statute;

EU General Data Protection Regulation ("GDPR"): Regulates the processing of personal data of European citizens. It applies to organizations both inside and outside the European Union (EU) that process personal data of EU citizens; or Australian Privacy Act "APA": Regulates the use of information of Australian citizens.

The actual identity of what an owner or manager of an enterprise IT network must identify for notification of a data breach to an affected individual will vary according to the applicable laws, regulations, rules, and policies and the definitions therein. For example, the GDPR applies to "personal data," defined as any data that relates to an identified or identifiable natural person (a living individual), whereas the APA applies to "personal information," which is defined as information or opinion about an identified individual or information that makes an individual identifiable. While these respective privacy laws might appear similar, "data" and "information" are two different things. Data is raw information, the basis for things like statistics. Information, on the other hand, is the end result, taking those statistics and declaring the findings. The GDPR requires businesses to declare what they do with that raw information. APA, on the other hand, focuses on information used to directly identify an individual. It follows that each of the data breach notification laws associated with each of these regulations are also related to notifying affected individuals of what data was disclosed (GDPR) versus what information (APA) about them was disclosed in the subject breach.

"Protected information" can also be subject to access or control rules as defined by one or more agency regulations or by one or more standard-setting organizations. Examples of such standards include:

Payment Card Industry Data Security Standard (PCI DSS): Companies that process credit card information must protect this data and conduct transactions within a secure network.

Ethical rules governing information disclosure as set out by medical associations, bar associations, religious organizations, etc.

The class of protected information that is defined as "PII" comprises any representation of information that permits or facilitates the generation of the identity of an individual to whom the information applies to be reasonably inferred by either direct or indirect means. Such inference of identity can be determined by data analysis techniques that exist today and/or as will be developed in the future. In some implementations, PII is defined as information: (i) that directly identifies an individual (e.g., name, address, social security number or other identifying number or code, telephone number, email address, etc.) or (ii) by which can be used to indirectly identify a specific individual in association with other data elements, i.e., indirect identification. Such data elements may include a combination of gender, race, birth date, geographic indicator, and other descriptors). Additionally, information permitting the physical or online contacting of a specific individual also comprises"

"Protected health information" ("PHI") as used herein is the term given to health data created, received, stored, or transmitted by HIPAA-covered entities and their business associates in relation to the provision of healthcare, healthcare operations and payment for healthcare services. PHI includes all individually identifiable health information, including demographic data, medical histories, test results, insurance information, and other information used to identify a patient or provide healthcare services or health care coverage. In the context of US law, "protected" means the subject information is protected under the HIPAA Privacy Rule. A further classification of PHI is "Personally Identifiable Health Information," ("PIHA") which is substantially co-extensive with many of the data elements that comprise "PII." PIHA includes:

Names (Full name or last name and initial)

All geographical identifiers smaller than a state, except for the initial three digits of a zip code if, according to the current publicly available data from the U.S. Bureau of the Census: the geographic unit formed by combining all zip codes with the same three initial digits contains more than 20,000 people: and the initial three digits of a zip code for all such geographic units containing 20,000 or fewer people is changed to 000

Dates (other than year) directly related to an individual

Phone Numbers

Fax numbers

Email addresses

Social Security numbers

Medical record numbers

Health insurance beneficiary numbers

Account numbers

Certificate/license numbers

Vehicle identifiers (including serial numbers and license plate numbers)

Device identifiers and serial numbers,

Web Uniform Resource Locators (URLs)

Internet Protocol (IP) address numbers

Biometric identifiers, including finger, retinal and voice prints

Full face photographic images and any comparable images

Any other unique identifying number, characteristic, or code except the unique code assigned by the investigator to code the data "Protected information" in accordance with the disclosure also includes "sensitive personal information," which is data consisting of racial or ethnic origin, political opinions, religious or philosophical beliefs, trade union membership, genetic data, biometric data, data concerning health or data concerning a natural person's sex life or sexual orientation.

"Protected information" as used herein can also comprise information that is subject to one or more contractual obligations that limit or prevent the disclosure of the information as described in the subject contract(s). Identification of such protected information can be via review of the contracts and aligning the subject matter set out in the contracts with a collection of information present in the managed data. For example, key words associated with the subject matter of the contractual obligations can be relevant to defining such protected information.

Further, "protected information" can be defined in the context of applicable laws, regulations, rules, and policies having such an information type or content that is of interest for maintenance of the confidentiality thereof. In this regard, "protected information" can be obtained from a definition incorporated in applicable laws, regulations, rules, policies, and contractual obligations that are applicable in context.

In further contexts, protected information can comprise information that is relevant in context for a company, organization, etc. that has value due to its not being generally known and for which reasonable steps are taken to prevent its disclosure such that it can comprise "sensitive business information." For example, "sensitive business information" is information that would pose a business or financial risk to its owner or a third party if unintentionally released to a competitor or the general public.

As will be appreciated, not all managed data will comprise "protected information" in that not all data accessed in a data breach event will be relevant to laws, rules, regulations, policies, or contractual obligations associated with compliance-related activities, as defined elsewhere herein. The types of managed data that comprises "protected information" in the systems and methods herein will nonetheless be recognized as being expansive. The protected information can also be identified by a company or organization as being undesirable for unauthorized disclosure to identified persons, groups, or companies, such as when such unauthorized disclosure may cause loss or reduction in value of intellectual property, financial harm, or reputational damage to the owner of the subject protected information.

When protected information is included in managed data affected by a data breach event, actual or potential disclosure of the protected information is possible. As such, upon notification of a data breach in an enterprise IT network that includes protected information, the manager of such network will generally be required to undertake one or more compliance-related activities as defined by laws, rules, regulations, policies, or contractual obligations associated with the subject protected information. A necessary first step in ensuring compliance with the laws, rules, procedures, policies, and contractual obligations that may be associated with protected information is the need to identify what protected information is present in the breached data files in the first order, and to align or link the identified protected information with an entity to which the protected information is associated.

Yet further, for compliance-related activities, such as notifications required under one or more applicable laws, rules, regulations, policies, or contractual obligations, the data elements that will comprise "protected information" that are relevant for identification in relation to a data breach event may differ in context.

For example, as defined under the GDPR, "personal information" (which is, by definition, "protected information" herein on account of its regulation under the GDPR) is defined as: any information relating to an identified or identifiable natural person ('data subject'); an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person.

Under the CCPA, "personal information" is information that identifies, relates to, or could reasonably be linked with an individual or the individual's household. The statute provides a non-exhaustive list of personal information:

Identifiers including real name, alias, postal address, unique personal identifier, online identifier, internet protocol (IP) address, email address, account name, social security number, driver's license number, passport number, or other similar identifiers;

Characteristics of protected classifications under California or federal law;

Commercial information, including records of personal property, products, or services purchased, obtained, or considered, or other purchasing or consuming histories or tendencies;

Biometric information;

Internet or other electronic network activity information, including, but not limited to, browsing history, search history, and information regarding a consumer's interaction with an internet website, application, or advertisement;

Geolocation data;

Audio, electronic, visual, thermal, olfactory, or similar information;

Professional or employment-related information; and

Education information, defined as information that is not publicly available personally identifiable information as defined in the Family Educational Rights and Privacy Act (FERPA).

The CCPA statutory definition also includes inferences from personal information used to create a profile about a consumer that would reflect the person's preferences, characteristics, psychological trends, predispositions, behavior, attitudes, intelligence, abilities, and aptitudes. It will be appreciated that such inferences are similar to those defined as "sensitive personal information," as are defined in other contexts.

Under the Colorado Data Protection Statute (Colo. Rev. Stat. § 6-1-716), "personal information," (which is, by definition, is "protected information" due to its regulation under this statute) is defined as:

(a) a CO resident's first name or first initial and last name in combination with any one or more of the following data elements that relate to the resident, when the data elements are not encrypted, redacted, or secured by any other method rendering the name or the element unreadable or unusable:

Social Security number;
Student, military, or passport ID number;
Driver's license number or other identification card number;
Medical information;
Health insurance identification number; or
Biometric data;
(b) Username or email address, in combination with a password or security question that would permit access to an online account; or
(c) Account number or credit card number or debit card number in combination with any required security code, access code, or password that would permit access to that account.

The above descriptions of each of the GDPR, CCPA, and Colorado Data Protection Statute are provided as non-limiting examples, only. As discussed herein, the various obligations, relevant information elements, and notification requirements will depend on the one or more laws, regulations, rules, policies, or contractual obligations that are at issue or that are relevant to a data breach event.

In some implementations, performance of compliance-related activities associated with a data breach event will incorporate the specific notification requirements of one or more applicable laws, rules, regulations, policies, or contractual obligations. Since the amount of review and processing needed to identify personal data and PII is likely substantially equivalent using in most data breach review scenarios, the system can be configured to search for and identify personal data elements. Therefore any identification of "protected information" that is associated with an individual can be conducted to identify such individual's personal data elements. Thus, in an implementation, the search can be configured to identify "personal data elements" for an individual as set out in the GDPR or for "personal information" as defined by the CCPA. Any compliance-related activities, such as notifications of affected individuals that includes an inventory of protected information that was a subject of the data breach event, can be configured to align with the specific requirements of each of the applicable laws, rules, regulations, policies, or contractual obligations. For example, a notification to an affected individual can include all of the information required under Colorado law but no more, which may be less than that required to comply with the CCPA or the GDPR. For the APA, the identified personal data can be configured in a notification to the affected person in the form of information, as required thereunder. In this regard, an identified disclosure of a person's address could be in the form of "your address" to comply with data identifications under the GDPR, in the form of "postal address" under the CCPA, and in the form of "where you live" for the APA.

Because managed data that comprises protected information will be subject to one or more laws, regulations, rules, policies, or contractual obligations associated with access thereto, managers of enterprise IT networks with which the protected information is associated must be able to not only detect when unauthorized access to such protected information—that is, a "data breach"—has been attempted and successfully achieved, these managers must also be able to suitably undertake the relevant compliance-related activities necessary to address the legally mandated and/or business appropriate activities that exist as a consequence of an IT enterprise becoming aware of the data breach.

A "data breach" is thus an event involving at least part of an enterprise IT network where managed data (as defined elsewhere herein) is stored or maintained in one or more databases operational with the IT infrastructure or that is stored on one or more on one or more devices in communications engagement therewith, is accessed, copied, transmitted, viewed, or used by one or more persons, devices, or systems that do not have authorization to do so, where such authorization is created (or prevented) by one or more laws, regulations, policies, rules, or contractual obligations generated or determined by government authorities, regulatory agencies, standards setting organizations, business associates or individuals having at least some authority to control access to or to manage the use of the subject protected information.

A data breach can originate from outside of an enterprise associated with the managed data files. For example, a person or organization with nefarious intent (e.g., a hacker, a foreign government, etc.) can seek unauthorized access to the managed data that may comprise protected information to further their own interests.

A data breach can also originate from inside of an enterprise when a person having authorized access to the managed data comprising protected information expropriates such data for their own unauthorized purposes. For example, a bank employee who has authorized access to customer personal and financial data for the purpose of doing her job can download the protected information to open credit accounts for herself.

A data breach does not have to involve intentional bad acts, however. To this end, a data breach can occur when protected information is improperly accessed or handled within an organization in ways that do not comply with laws, regulations, rules, policies, or contractual obligations generated for or associated with the subject managed data. For example, an employee who is transferred to another department in a company may retain access to databases that contain protected information that are no longer relevant to the roles and responsibilities of her current job. If this employee previously worked in the company's human resources department, but now works in facilities management, continued access to her fellow employee's personal information may rise to the level of a data breach in some contexts. As mentioned previously, depending on the regulatory framework associated with a type of protected information, allowing an unauthorized person to view protected information may rise to the level of a data breach, even if the person did not actually view the subject information.

A data breach can also occur when a device (e.g., a computer, laptop, cellular phone, internet enabled device, etc.) has been lost or stolen such that managed data that comprises protected information that is stored thereon may be accessed, copied, or used by a person, device, or system, that does not have authorization to do so and whereby such activities would be out of compliance with one or more applicable laws, regulations, rules, policies, or contractual obligations associated with such protected information.

A "data breach event notification" can be generated when information about the occurrence of a data breach is received by a manager of the enterprise IT network, such as automatically from a computer notification (e.g. via a network security application operational on the managed network) and/or from a human (e.g., user, employee, third party, law enforcement officer, etc.) that one or more systems, applications, devices, persons, organizations etc. has acquired, or has potentially acquired, access to managed data operational within the enterprise IT network. A data breach event notification can also be generated when unauthorized access to the managed data is attempted but not achieved, when it is at least possible that out of compliance access to the protected information may have been attained. A data breach event notification can also be generated when out of compliance access to the managed data operational on the enterprise IT network may have occurred, but it is not presently known whether such access in fact occurred.

A data breach event notification can also provide information relevant to a data breach event while events are underway, such as when all or part of an enterprise IT network is being subjected to an attack from an external source (e.g., attempted or actual access to files from an unauthorized external server/network) or from abnormal activity detected from within the network (e.g., unusual downloading or forwarding activity). Such data breach event notifications can be generated by intrusion detections systems that monitor activity within and among a managed network in need of monitoring. Such systems typically will provide audit trail information that identifies the files that were accessed by a malicious external attack by a hacker or from unauthorized activity by a person operating internally. Alternatively, a data breach event notification can be generated as a result of an audit that identifies activities associated with a data breach occurred at some time in the past. In either situation, the enterprise that owns or manages the IT infrastructure can be subject to compliance-related activities as set out in applicable laws, regulations, policies, rules, or contractual obligations if the managed data files associated with the data breach event in fact comprise protected information.

Of course, there is no requirement to undertake compliance-related activities unless there is protected information present in the managed data associated with the data breach event. Thus, prior to undertaking any compliance-related activities associated with a data breach event, the nature and content of any protected information present in the accessed managed data must be determined. That is, the collection of managed data must be reviewed to determine whether it comprises any protected information and if so what entities the protected information can be aligned with.

A first step to addressing a data breach event notification will establish the scope of a data breach for the enterprise IT network. In many cases, data breach events are contained to a specific server, data file type, a person(s) having access to only certain file types, etc. Compliance-related responses to data breach events should thus be substantially limited to those areas of the enterprise IT network implicated in the breach event because only those portions will be subject to compliance-related activities. To this end, digital forensics as incorporated in intrusion detection systems operational with the enterprise IT network or implemented as tools in post-breach analysis and auditing can typically identify a collection of data files that was actually or potentially associated with the breach event. Suitable digital forensics activities and systems suitable for use therein are known to those of skill in the art. Once the digital forensics activities are conducted to identify the areas or aspects of the enterprise IT network having managed data that was actually or potentially accessed in the data breach event, the data file collection derived from the enterprise IT network can then be analyzed with the methodology herein to determine whether the first data file collection comprises protected information and, if so, the systems and processes can be configured to assist the enterprise IT manager in undertaking the necessary compliance-related activities associated with the data breach event. This identified data file collection comprises managed data having an unknown amount of protected information therein. Such data collection is therefore of interest to examine to determine whether any protected information is included therein.

Broadly, the systems and methods herein are configured to facilitate automated review of a first data file collection derived from the enterprise IT network to detect the presence or absence of protected information therein. Data files automatically identified as including protected information will be included in a second data file collection that is provided for at least some human review. Any data files in the first data file collection that cannot be identified with a high degree of confidence as including or not including protected information therein can also be incorporated into a second data file collection as set out hereinafter.

Protected information identified in the automated review can be classified according to a type of protected information relevant to the subject data file collection context. Data files that have been identified in the automated review as having protected information therein are provided for human review as a "second data file collection." The second data file collection can then be reviewed by at least one human reviewer to confirm the presence of protected information in that data file collection, so as to allow the automated determination of protected information in the subject data file to be validated by the human reviewer. The computer can also assist the human reviewer in aligning the subject protected information with an entity to which the information is associated. The computer can further assist the human reviewer in adding the validated protected information to a database configurable for compliance-related activities associated with the data breach event. Any human reviewer activities can be incorporated as training sets for use in machine learning libraries to enhance the performance of subsequent detection, classification, entity resolution, and compliance-related activities associated with the same data breach event notification or other data breach event notifications for the same or different enterprise IT networks.

As used herein, a "first data file collection" is the universe of data files that has been identified as associated with the data breach event for which compliance-related activities are associated as a result of the data breach. A "second data file collection" is the subset of the first data file collection, where the subset has been at partially automatically reviewed according to the methodology for detecting the presence (or absence of) protected data therein, as such term is defined herein. The second data file collection can include data files that are identified by the system as having protected information present therein, and a confidence level for such identification can be associated therewith. The second data file collection can also include data files reviewed by the system that may not include protected information therein, but for which the system could not provide a level of detection at the confidence level needed for the data review process. The confidence level can be selected as a value, for example, >0.90, >0.95, or >0.99, for example. Any data files that were identified at the applicable confidence level as not having protected information therein can remain in the first data file collection.

With respect to the protected information detection aspects of the present disclosure, the methodology herein can allow identification of protected information in the first data file collection included in managed data associated with a data breach event, wherein the managed data present in the first data file collection comprises each of structured, unstructured, and semi-structured data.

As would be appreciated, "structured data" is data that comports with a pre-defined data model and therefore can be analyzed according to rules operational with that model.

Structured data conforms to a tabular format with relationships between the different rows and columns. Each field of data will be independent and thus can be accessed separately or jointly along with data from other fields. Common examples of structured data are Excel files or SQL databases. Each of these have structured rows and columns that can be readily sorted.

In contrast, "unstructured data" is data that either does not have a predefined data model or is not organized in a pre-defined manner. Unstructured data has internal structure but is not structured via pre-defined data models or schema. It may be textual or non-textual, and human- or machine-generated. It may also be stored within a non-relational database like NoSQL. Data that is complex or heterogeneous and cannot be fit into standard fields is unstructured data. Unstructured data can be stored in a data lake, which is a storage repository where a large amount of raw data is stored in its native format. To manage unstructured data, NoSQL databases replace relational databases as they can handle data variety and large amounts of data. Examples of unstructured data include:
  Image files
  Video files
  Audio files
  Medical records
  Social media content
  Satellite imagery
  Presentations
  PDFs
  Open-ended survey responses
  Websites
  Data from IoT devices
  Mobile device data
  Weather data
  Conversation transcripts (e.g., chat logs)

"Semi-structured data" is information that is not associated with a relational database or other rigid organizational framework but that nonetheless comprises at least some classifying characteristics that can allow analysis. As would be appreciated, the metadata or other markers associated with semi-structured data make it possible to separate semantic elements and create hierarchies in data and fields. Examples of semi-structured data include:
  E-mails
  XML and other markup languages
  Binary executables
  TCP/IP packets
  Zipped files
  Integration of data from different sources
  Web pages In some situations, it can be difficult to parse the content of the data files in the first file collection as being entirely either the "semi-structured" or "unstructured" data types. For example, the data within an image file is considered to be "unstructured," but an image file is also typically accompanied by metadata that can provide useful information in context. However, both "semi-structured" and "unstructured" data are distinguishable from "structured" data.

"Structured data" can also be included within unstructured or semi-structured data. For example, a table that would comprise structured data if configured as a spreadsheet data file (e.g., excel, csv) can be included in a PDF file, in an email, or the like.

To facilitate review of the first data file collection, the collection can be segregated, such as by copying or removal from the enterprise IT network to facilitate review, as well as to reduce the possibility that data files infected by the data breach might propagate through the enterprise IT network. The first data file collection can thus be uploaded onto a dedicated server or device for analysis, review, and classification of the contents thereof.

To determine whether protected information is incorporated in the first data file collection, each data file in the collection is analyzed automatically by the computer to identify information or elements of information that may comprise protected information therein. Various methodologies can be used individually and collectively to identify protected information in the first data file collection comprising each of structured, unstructured, and semi-structured data.

As would be appreciated, for data files comprising structured data, protected information comprising each of PHI, PII, and other defined terms can be readily identifiable therein because the subject protected information will be identifiable by its classification in the database or by operation of relational databases associated therewith. That is, an automatic search for a SSN, passport number, credit card number etc. present in a structured database that are classified as such can, but will not always, return the desired protected information result because the number will be included in the data in a readily searchable and retrievable form.

In other situations, the columns associated with protected information may not be labeled in a manner that is expected from structured data. For example, an organization or a data entry person may use a customized or 'bespoke" label for data that is otherwise included in a structured data file. Such information may then be difficult to automatically identify the entries in the column, even while a human reviewer might be readily able to identify the subject data entries as being a SSN, address etc. The methodology herein can allow automatic detection of protected information included in a structured data file type that is not categorized or identified in a standard, or expected, manner.

Yet further, the disclosed methodology allows analysis and detection of protected information in a structured data file type on a cell by cell level, that is, on each cell independently. This is different from prior art methodologies that analyze data included in a structured data file by considering an entire row as a single "cell" and it causes problems. For example, using these techniques, a phone number entered as 7031230998 next to a cell that has a DOB as 0903, would be automatically identified using prior art methodologies as 70312309980903, which would not be recognized as either of the protected data types of "phone number" and "DOB." In another example of prior art methodologies, the combination of two data elements identified in a data file may be combined to form a false positive (e.g., detected as a PII element when the content of the combined data elements is not actually a PII element). In this regard, a data file can include a column for PIN 321 and a column for Account number 3231298. Neither of these, within the context of the data file, are PII elements. But when combined using the prior art processing methods, the automatic detection could falsely predict that the subject information PII element (i.e., 3213231298) could be incorrectly identified as a SSN when in reality, it is the output of poor automatic identification. The present methodology can thus enhance the accuracy of such automatic identification.

PII, PHI, and other protected information that is relevant in context will often be present in both semi-structured and unstructured data files. For example, an email-a semi-structured data file—may also include the person's SSN, passport number, and credit card information, but such data will likely be present therein in a format or manner from which the identity of the SSN will not be readily apparent in an automated search if the search is not also configured with those relevant aspects of the SSN incorporated in the search tools. Similarly, a PDF—an unstructured data file in its printed/exported form—may include a person's SSN, passport number, and credit card information, but the data may not be readily identifiable therefrom in an automated search even if the PDF has been converted to a printed/exported document.

To identify the presence of protected information in the first data file collection, automated analysis is conducted using one or more techniques that are configurable to identify protected information in structured and semi-structured files. Because a defined universe of information types/content/subject matters can comprise a finite—and thus definable-number of protected information categories or classes that are relevant in the context of a data breach event involving an enterprise IT network, the inventors herein have determined that it is possible to configure the automated search engines to identify information that aligns with the classes or categories of protected information of interest. Rather than the search of the managed data being untethered to an end result, the search schema used herein for identifying protected information can be configured for the identification of information that is both likely to be present therein and that is likely to be relevant to compliance-related activities resulting from the data breach event.

To this end, the system can be configured to identify protected information that is associated with a plurality of defined categories that is relevant to the content of the data files affected by a data breach event can be generated. In this regard, schema for identifying each of a pertinent protected information type can be generated, where such schema is suitable for use in identifying the protected information of interest in managed data files comprising each of each of structured, unstructured, and semi-structured files data types.

A further insight of the inventors herein is that many types of protected information present in specific and consistent formats in and among data files, especially within a single organization. Moreover, even among different organizations, professional conventions often dictate that similar formats as used to input data. In other words, even though the data files might appear to be difficult to review due to their nature as unstructured or semi-structured data types, there are also likely to be similarities in the protected information of interest in these files that can be leveraged to facilitate the automated review thereof. Moreover, specifically in relation to PII, information that is likely to comprise PII will often be consistently associated with other information, such as a name, address, DOB etc. Thus, automated methods such as machine learning, natural language processing ("NLP"), pattern identification and matching, convolutional neural networks, etc. can have utility in the automatic detection of protected information that is present in a first data file collection. By automatically identifying data files as actually or potentially including protected information, human review of the data files associated with a data breach event can be streamlined and human review order can be prioritized.

It has also been recognized that the presence or absence of certain types of other information can tend to indicate information in the subject data file is or is likely not to comprise protected information in context. In other words, whether information in an individual file itself comprises protected information depends on the nature and purpose of the individual data file, and that such nature and purpose can be evaluated using automated techniques, such as NLP, pattern matching, file comparison, machine learning, convolutional neural networks, and the like. More specifically, the application of techniques such as information extraction, coreference resolution, part of speech tagging, etc. can enhance the ability to not only automatically identify the information within context for each data file being automatically identified, but also to automatically identify when specific groupings of distributed information in a single data file are related to the same entity. In this regard, it has been found that specific and consistent formats and patterns or the absence thereof can be leveraged to identify the presence of protected information in the first data file collections, as well as to provide information associated with the type of protected information present in the collection and to provide information about the number of each categories.

In a non-exclusive list, search schema useful for the identification of PII (or more broadly "personal information") in managed data files can be applied or developed as necessary for the following information forms:

A person's name
Date of birth
Home Address
Home Phone Number
Personal Email Address
Identifiable email addresses associated with PII
Social Security Number or federal Individual Taxpayer Identification Number (ITIN
Vehicle identifiers and serial numbers, including license plate numbers
Government identification (e.g., driver's license, state ID card, Passport number, military ID, Known Traveler Number, etc.)
Username and password for any online account
Personal phone or fax numbers
Biometric information (fingerprints, retina scans, facial recognition)
Map and trip information (GPS tracking information)
Internet Protocol (IP) addresses
MAC addresses For protected information that is PHI, the system can be configured to identify protected information that is associated with health information for an individual. In a non-exclusive list, rules for the identification of PHI in managed data files can be applied or developed as necessary for the following:

Information that relates to (i) the physical or mental health or condition of the individual; (ii) the provision of health care to the individual; or (iii) payment for the provision of health care to the individual.
Date of death (full date of death)
Dates of treatment (includes admission and discharge dates)
Medical record numbers
Health plan beneficiary number
Full-face photographs and any comparable images
Health Insurance Account Information
Payments—Payment for provision of health care for an individual. This may include copay, premiums, deductibles, etc.
Treatment Information (e.g., diagnoses, treatment information, medical test results, and prescription information)
Uniform Device Identifier ("UDI"): a coded number registered with standards organizations, and would incorporate a variety of information, including (but not limited to) the manufacturer of the device, expiry dates, the make and model of the device, and any special attributes that the device may possess.

For protected information that is financial information, the system can be configured to identify protected information that is associated with finances, financial institutions, tax records, etc. In a non-exclusive list, rules for the identification of financial data in managed data files can be applied or developed as necessary for the following:

Financial account information (account number or routing number (e.g., bank information, security codes or questions)

Payment card information (e.g., credit/debit card numbers, PIN, expiration, security code, security questions, etc.)

Internal Revenue Service ("IRS") PIN

As indicated, search schema can be applied from existing methods or developed as needed to identify the relevant protected information from the first data file collection. As an example, a PIN number can be identified in the first data file collection using an implementation that is configured to identify a PIN in a managed data file as protected information, and to further identify that PIN as likely being associated with a financial or tax record, as opposed to a PIN for a conference calling account.

In an implementation, to be considered protected information in the context of compliance-related activities associated with a data breach event, the PIN must be determined to be associated with a financial or other online account and provide a way for the account to be accessed. A search strategy configured as [/d]{4,8} would be enough to find a 4 to 8-digit pin, but this strategy would not be sufficient to determine that the subject PIN is related to accessing an online account as opposed to being a PIN for a conference call bridge or used in other purposes. To more accurately identify whether the a 4-8 digit number present in a data file in the first data file collection is likely to comprise a PIN associated with a financial institution or credit/debit card, the system is configured with pattern matching capabilities that evaluate the context of the 4-8 digit number as it appears in the subject data file. To accomplish this, the system can be configured to detect the words adjacent to the PIN to establish whether the PIN is likely to be associated with a conference call system or whether it is more likely to be associated with a financial institution. If the former, the PIN can be ruled out, or at least relegated to a lower priority for review, because the data file including the number is not likely to include or to be associated with protected information relevant to compliance-related activities. If the latter, the 4-8 digit number will be identified as being a PIN that might be accompanied by or be associated with protected information relevant to compliance-related activities. The data file can be classified by the system as including protected information having the category of "PIN," where the identification can be queued up for human review as part of the second data file collection.

Yet further, the methodology can analyze the data file to identify the overall subject/context therein and to provide information associated therewith. For example, the system can be configured to determine the type of data file, such as whether the data file is likely to be an email, a meeting invitation, a medical-related document, etc. Such identification can facilitate the prioritization of any human review of such data files, for example. Moreover, the generated information can be used to further enrich the automated analysis system for subsequent data file review.

The system can be further configured to determine the type of PIN number. For example, an IRS PIN is considered to comprise PII on its own terms in some state privacy laws, whereas a PIN for a financial institution would not be unless accompanied by other identifying information that allows an individual identity to be resolved therefrom. In this regard, natural language processes could be helpful to analyze the text in the data file to determine whether the document sender is the IRS. Yet further, IRS documents commonly sent to taxpayers can be included in feature sets used in machine learning processes and the data file compared to such IRS letters. Other methods of deriving context for an identified PIN of interest can be utilized. Moreover, validation of the automatic identification by the human reviewer can add to the accuracy of such context-based identifications.

Another example of automated analysis of the data files in the first data file collection is to determine whether a SSN is present therein. Prior art methods of identifying SSNs use a regular expression that comports with the recognized SSN format such as [/d]{3}–[d]{2}–[/d]{4}. The inventors herein have determined that this regular expression pattern does not take into consideration spaces left between the numbers or a digit-only representation of a social security number, as might occur in an email, text, or transcribed audio file where a person may not be conforming to the standard method of representing the SSN. To address non-standard representations of SSN that may occur in unstructured or semi-structured files, the system is configurable to use a pattern to check for any 9-digit combination grouped in a 3/2/4 fashion (including spaces or dashes between). If the system identifies this combination with dashes or spaces, the identified 9-digit number is validated as likely being an actual SSN by using the US Social Security Administration rule for issuance of SSNs. The context of the text or any other numbers used around the appearance of the SSN and in the data file in which this 9 digit number appears can also be examined via NLP, machine learning, etc. to generate a confidence level of whether a 9 digit number appearing in the data file in fact is likely to comprise a SSN. For example, the results of data file evaluations where SSNs were confirmed to be present in a data file can be compared to a current data file evaluation. In this regard, data files in which SSN appear are often similar within organizations, at least because a department or individual employees are likely to employ fairly consistent methodologies when capturing relevant identifying information, such as SSNs. The likelihood that a number comprises a SSN or any other such identifying information can be associated with a confidence level, if appropriate for a use case.

In a further implementation, if the system identifies protected information at a low confidence, that information can be compared with other information in the first collection of data files for other occurrences of all or part of that identified information. For example, if a low-confidence SSN is automatically detected in the first collection of data files, that identified number can be checked against known/validated/high confidence instances of that number in the first collection of data files to determine if that sequence of digits has been detected as an SSN in other data files. If it has, optionally with a context-based data file comparison, the SSN candidate previously returned as a low confidence identification, the previous confidence level can be modified upward. As would be appreciated, such enhancement of confidence level can be incorporated in machine learning processes to enrich subsequent automated data file analysis. This approach can be used with not only SSN but other unique identifying information such as credit card, MRN, account numbers, phone numbers, etc.

In addition to detection of protected information in a data file, the system can also be configured to allow validation of the presence of such protected information therein by comparing the identified protected information with a rule associated with that category or type of protected information. For example, an SSN may be detected because a 9 digit number is identified in a file. The system can conduct a further analysis to confirm that such number is actually a SSN, such as by comparing the number to the rules associated with the issuance of SSNs. A credit card number or routing number may be detected due to its pattern or use within a sentence but then discarded if the validation method (e.g., the Luhn algorithm) does not calculate properly or if the credit card number doesn't fall into the proper range for card issuers. Such validation can enhance the automated detection of protection by improving the accuracy of protected information identification.

As indicated with regard to the discussion of PINs and SSNs, text surrounding the identified information type and in the subject data file in which the identified number is present can be evaluated for context to enhance the confidence that an identified information type is correctly identified and therefore categorized.

Business sensitive information can be identified by generating search schema that is relevant in context. For example, if a breach event is identified as occurring in a part of an enterprise IT network where confidential business plans are maintained, a search can be generated to identify financial projections, business plans, or R&D information.

In a significant implementation of the present disclosure, the systems and methods can greatly enhance the identification of protected information in image data that is present in the managed data. As would be appreciated, images comprise, at best, only semi-structured data for automated processing (e.g. metadata) or, at worst, only unstructured data. Because personally identifiable information often is included in business records in the form of driver's licenses, insurance cards, passports, etc., image data must be accurately reviewed in compliance-related activities associated with a data breach event.

In some aspects, the automated review of the first data file collection includes an image analysis engine configured to identify image data that likely includes protected information, as well whether the image data is likely to not comprise protected information (e.g., logos, icons, etc.). In this regard, certain types of images likely to appear in business records will include protected information. In a non-exclusive listing, image types that may be present in the managed data that include protected information can include: driver's licenses, passports, government or employer-issued ID cards, Social Security cards, insurance cards, or the like. The formats of these standardized data files, in some implementations, can be automatically identified and, since they are known to incorporate protected information therein, the automated system can identify these image files positively. Image data files that cannot be automatically identified as including protected information can be included in the second data file collection as unclassified image data.

Once each of the data files in the first data file collection are automatically reviewed for the presence (or absence) of protected information, those data files identified as including protected information are provided as a second data file collection.

The second data file collection is then ready for further review to validate the presence of protected information in each of the data files, as well as to assign an entity to each of the protected information identified therein and to incorporate the protected information into a database. Any data files in the first data file collection that cannot be identified with confidence as including or not including protected information, such data files can be incorporated into the second data file collection for human review. In some implementations, some image files will be included in the second data file collection for human review thereof. Those data files in the first data file collection that are identified as not including protected information can be retained for further review using information obtained from actions of the human reviewer on the data files in the second data file collection.

When the data files in the second data file collection are categorized, the system, manager, or human reviewer can filter and prioritize review to focus on those categories of data files that are more likely to include protected information. Such prioritization can facilitate the speed and accuracy of the overall review process by developing more robust indexing information early in the process. Such robust information can, in turn, be incorporated into the processes on an ongoing basis to allow pro-active processing of the data files that have not yet been reviewed by a human and/or to allow reprocessing of previously processed data files.

In this regard, the actions of the human reviewer to validate the automatic identifications and to conduct manual data entry where automatic review is not yet possible will create further improvements in a data breach file collection currently under review. The human reviewer action with regard to data files in the second file collection that have been reviewed can be incorporated into the systems and processes to improve subsequent review activities while the second file collection review is still under way. For example, if the automated identification is determined by a human reviewer to be correct (e.g., the human reviewer accepts this identification and categorization of protected information made by the automated system), the confidence level for subsequent identifications having the same characteristics can be enhanced. In some implementations, subsequent automated review of data files having the same characteristics as previously validated by the human reviewer can be generated with high confidence because the human reviewer has already identified the automated review of such data files as having a high confidence of accuracy. On the other hand, if the human reviewer rejects the identification provided by the automated review, the system can be configured to not make the rejected identification in future automated reviews and, optionally, to correct any data files in the second data file collection that have not yet been reviewed. The quality of the training sets already incorporated in the machine learning models can thus be improved, and new training sets can be generated.

The system or a user can generate categories of data file types in which the data files identified from first data file collection as having protected information can be classified in the automated review process. In an implementation, the categories can be generated as data elements or information types that are likely to be included in the managed data overall, as well as being identified as "protected information" therein that is of interest for review. For example, there will likely always be categories of protected information that will be pertinent to a data breach event at least because some laws, rules, regulations, policies, or contractual obligations will be applicable to most, if not all, data breach events. This is the case for data elements that individually or collectively are likely to comprise PII. Other managed data may be unlikely to include PHI or protected financial data; for example, an e-commerce website would generally not hold PHI for its customers. The system can be configured with functionality to identify each information type that can be relevant to a plurality of compliance-related activities relevant to the business of the enterprise that is responsible for protecting the data of its customers, clients, patients, members, etc. The manager of the data file analysis process associated with the data breach event can select each relevant search functionality as appropriate for the managed data and any protected information therein. Still further, the system is configurable to allow a data file analysis manager to develop search schema or to implement existing search schema to address a business case relevant to the subject matter of the managed data and any compliance-related activities related thereto.

While all of the data files in the second data file collection that the automated analysis system identified as including protected information may not, in fact, contain protected information, the automatic identification of such data files as potentially including such information can facilitate prioritization of data files for human review thereof. In conducting the review of the data files in the second data file collection, the computer, a manager of the data breach review process, or a human reviewer, can select a category of information (aka data element types) and the data files therein can be reviewed. In an implementation, for automatic selection of the data files for review, the computer can provide a suggestion to a human reviewer based upon a derived confidence level associated with the automated identification step. When categorized into data file types, the system, manager, or human reviewer can prioritize review to focus on those categories of data files that are more likely to include protected information. Such prioritization can facilitate the speed and accuracy of the overall review process by developing more robust indexing information early in the process. Such robust information can, in turn, be incorporated into the processes on an ongoing basis to pro-actively process the data files that have not yet been reviewed by a human.

In an implementation, the output of the automated review of the first data file collection can be filtered to identify data files that include a larger number of elements on a per data file basis. It can be expected that data files that are identified as including a larger number of protected information elements would allow more information to be extracted from a single human's review thereof. Because any extracted information has value in informing the ongoing data file collection review process, it can be beneficial for the system, a manager, or a human reviewer to prioritize data files having a plurality of data elements identified in the automated process. Thus, in some aspects, review of the second data file collection can be accelerated because such data files can allow a greater amount of relevant data and reviewer information to be developed earlier in a human review process, where such relevant data and reviewer information can be incorporated into subsequent data file review activities related to the subject data breach event.

For large second data file collections and/or short review times, a plurality of human reviewers can be employed, and the second data file collection can be separated into batches or subsets of the whole second collection. The files can be checked out by each reviewer to allow each to work on their own devices, or the reviewers can each be logged into and conduct their own review simultaneously on a shared server. If the reviewers work on their own devices, the devices can be in communications engagement with the other devices so that updates to the systems from ongoing data file review can be transmitted to each reviewer.

The computer can select a plurality of data files for human review based upon a determined probability that the plurality of data files is likely to be correctly identified as having protected information therein. If the computer determines that the selected plurality of data files has a low probability of the automated review being accurate, such data files can be prioritized as needing more scrutiny by human reviewers. The actions of a human reviewer with respect to the selected plurality of data files can be incorporated into the systems and processes to correct any inaccurate identifications conducted, thus reducing the amount of human review necessary in the entire dataset.

Still further, the data files in the second data file collection can be presented in categories for human review thereof in any meaningful arrangement for selection and review thereof. For example, the data files can be categorized as only a specific type of information (e.g., SSN, credit card numbers, medical information, etc.). Categories can also be arranged to provide for review of groups of categories of data files that are identified as being likely to either comprise or to be associated with protected information of interest in the data breach review and compliance-related activities associated therewith. For example, data file types associated with "identification" or "demographic" information can be filtered for review, as those can be expected to likely comprise PII or the like. More generalized review of categories such as "data files that comprise contact information" can also be generated. Notably, the systems and methods herein can be configured to address the specific context of compliance-related activities associated with the data breach events.

The categories can also be arranged as identified data file types for selection and review thereof, where the types are known or expected to comprise protected information. Automated analysis of the data files can be used to identify the type of data file. For example, machine learning, NLP, etc. can be used to identify the nature of the data file and to generate categories thereof. As non-limiting examples, the data files in the second data file collection can be identified as and categorized as:

Invoices
Tax Forms
Mortgage Documents
Loan Applications
Bank Statements
Credit Card Authorizations
Brochures/Marketing Materials
Manuals
Medical Forms
Insurance Documents
Resumes/CV's
Court Documents
Jail Records
Vital Records (Birth/Death/Marriage Certificates)
School Related Forms
Company documentation marked "confidential"
Documentation of other companies marked "confidential"

In a further implementation, the automated review results can be presented in a high-level arrangement that classifies the nature and type of protected information identified in the automated analysis. In the context of PII, the system can identify how many data files individually comprise data elements that are commonly associated with PII either on their own terms or in combination with other data elements, how many data files include only contact information, how many data files include both a name and a PII data element, and how many data files contain only PII data element with information that is not associated with contact information. As would be appreciated, the sum of the generated amounts of identified protected information data elements placed into the various categories may be larger than the number of actual data files that require human review because a single data file may comprise more than one type of protected information therein. In this regard, it can be useful to provide information to users of the total number of unique data file types having protected information therein so that the human reviewer can understand the scope of her review and, if appropriate, the human review can be split amongst a plurality of reviewers.

As can be observed, the categorization of the preliminary data file reviews can be arranged in any way that is useful to the organization, manager, or human reviewer in context. Knowledge about the number, type, and content of data files that might comprise protected information can allow better planning and staffing of the review, which can allow the often-onerous compliance-related deadlines to be better managed.

Data files in the second data file collection can be reviewed by at least one human reviewer to validate the actual presence (or absence) of protected information therein. Data files that the automated review process identified with a high degree of confidence as not including protected information therein can be removed from the human review queue. However, for quality control purposes, it can be beneficial to confirm the accuracy of automated review of at least some of this group of data files in an optional recheck step. Such a check can be by a human reviewer who reviews at least some of the data files identified in the automated identification process as not having protected information therein as a check on the accuracy of the automated process. Such files can be automatically selected for recheck by the computer, such on the basis of a confidence level that the automated protected information identification was correct. Any user actions related to the data file re-check can be incorporated in machine learning processes to enhance subsequent first data file collection automated review processes. Alternatively, or in conjunction with at least some human review, the data files identified by the automated review process as not comprising protected information can be re-evaluated once the review of the second data file collection has progressed. Such later automated review can incorporate training information obtained during the human review process where previous decisions made by the automated system can be validated or corrected. For example, if a human reviewer consistently re-categorizes a specific file type in the second data file collection from a first category to a second category, or from a relevant protected information category to an irrelevant information category/type, such human reviewer information can be used to reprocess the data files in the present project as well as in subsequent automated first data file collection reviews.

An improvement of disclosure herein is the inclusion of an image review and classification step, wherein at least some of the image data that could not be automatically identified in the first data file collection analysis step as having protected information therein can be reviewed by a human who can identify the type of image associated with each image data file and to allow such identification information to be automatically applied to image data that has not yet been reviewed. The methodology also allows image data that has previously been identified by the automated process as having protected information therein to be validated by the human reviewer.

To facilitate image data review by the human reviewer, the methodology herein incorporates the automatic collection of a plurality of the image data for presentation as a grid view to allow the human reviewer to quickly select or deselect images as including or not including protected information therein. If one or more images in the plurality of images presented to the human reviewer comprises protected information, the reviewer can quickly select such images for further review so as to allow the protected information present therein to be identified. Other images can be marked as not including protected information. Actions associated with the human reviewer's selection of the presented images as including protected information or not having protected information therein can be incorporated into the processes for use in the processing other image data in either or both of the first or second data file collections as training sets for analysis of other image data files. The data files can be native image files (e.g., jpeg, png, etc.) or the images can be embedded in another file type (e.g., an image in an email or a PDF file).

For example, the human reviewer can be provided with a batch or subset of data files derived from the second data file collection for review. This batch will comprise data files that have been automatically identified as including protected information, or as having data therein that the automated processes could not identify as comprising or not comprising protected information at a high confidence level. This batch of data files from the second data file collection may include some image data. Some of these image data files may have been automatically identified as including protected information (e.g., the image files were identified as being drivers' licenses) and some of these image data files were identified as not having protected information automatically identifiable therefrom. Each of the image data files can be displayed as a group of images on the human reviewer's device display. She can select each image file that is shown on her display that includes protected data. She can also select all image data files that do not include protected information. Upon selection of the images on her display, a new collection of images from additional image data files can be displayed to her for selection.

Any selections made by the human reviewer can be incorporated as training sets for use in analysis of image data files where the automated analysis was not able to identify the presence (or absence) of protected information therein. In an implementation, the first data file collection can comprise a form of photo identification that is used in the normal course of business for the enterprise, but which has not previously been identified by the system. Although such image data may be ubiquitous in the first data file collection, the system will not be able to identify this image data if it is sui generis. However, once this image data has been reviewed by a human reviewer, information associated therewith can now be included in the training sets to allow image data having the same form to be automatically identified as having protected information therein. Any manual indexing conducted to identify the content of protected information and entity identification in the reviewed image files can also be included in training sets for use in the current data breach review project. While there may be more human review of image data files and manual protected information extraction and entity identification early in the review process, as the project moves forward, the system will be trained to allow greater automation of the image review process.

The system can be trained to identify images that will not comprise protected information, such that such images will not need to be presented to the reviewer even in the grid format. Photos or memes that may have been shared by employees can also be detected and removed from the human review process.

Yet further, the system can display images to the reviewer with information how other reviewers, including the automated review process, has previously tagged or assessed a subject image or group of images, by either or both of image content/subject matter (e.g., the presence or absence of protected information therein) or the type of image (e.g., identification card, driver license, Social Security card, passport, meme, selfie, etc.). When a high confidence in a previous human and/or automated image review process is generated by a confirmation by a subsequent human reviewer, the accuracy of the systems and methods herein can be enhanced, especially in regard to the ability to perform the review of all or part of the managed data automatically or at least with a lighter amount of human supervision over time as the machine learning systems become more deeply trained.

In further implementations, an analog to the image identification process can be used with other data file types. For example, a plurality of emails, word-processing documents (e.g., Word, Google Docs, etc.), spreadsheet files, etc. can be collected for presentation of a plurality of each data file type as a collection or a mix of data file types on the user's display. The user can select or deselect each of the individual data files in each collection as comprises at least some protected information elements. This can enhance the review of data files as either having/confirming protected information elements therein for generation of the second data file collection and/or for the review of such data files in the second data file collection. The information generated therefrom can be incorporated into data file review processes for the present data file collections and used elsewhere.

In a further aspect of the methodology, a batch of data files that have been identified as potentially including protected information are each, independently, queued up to one or more human reviewers for identification of the protected information therein and to generate entity identifications as required for compliance-related activities.

To this end, a human reviewer, or more typically, a group of human reviewers, will be provided with a collection of data files that potentially comprises protected information and that therefore will be associated with compliance-related activities associated therewith. Depending on the applicable laws, rules, regulations, policies, or contractual obligations, the type of protected information in the data file, and the person or organization affected by the data breach event, there may be a variety of requirements for notification, remediation, and liability associated with the subject data breach event. In order to comply with such requirements, the protected information present in the data files must be aligned with or linked with an entity that is identifiable from a data file or a collection of data files and the protected information therein must be identified. That is, in order to comply with applicable laws, rules, regulations, policies, or contractual obligations, the process must allow determination of what entity was damaged or potentially damaged by the breach by connecting that entity with any and all protected information that was involved in the data breach.

As should now be apparent, the "who" and "what" are not trivial determinations in data breach events involving large numbers of data files of different types that involve many entities that may have different forms and content of entity identifications included in the managed data set. For example, a person's insurance card typically does not include information that is personally identifiable for that person other than the insured's name and proprietary insurance plan identifiers. (However, an insurance card will comprise "personal data" as defined by the GDPR.). Thus, an insurance card by itself may not comprise "PII" as defined in one or more applicable laws, regulations, rules, and policies. However, a managed set associated with a data breach event may contain medical records where a patient's name is blanked out for privacy reasons, with the information for billing purposes included as insurance plan information. Thus, the combination of the insurance card and the medical record together would constitute both PII and PHI for that person. Using prior art review methods, information extracted from the various data files by a human reviewer will be incorporated in different spreadsheet columns maintained in a single spreadsheet by that reviewer. In the example, the column for "name" would be filled out for the insurance card, but for the medical record, there would be no "name" column populated. However, for each of the individual files, the column with "insurance plan information" will be completed. Thus, compliance-related activities associated with the medical record will require the step of cross-matching the various columns generated from human review. As would be appreciated, this can be a highly time intensive process, especially when a large protected information data breach event occurs.

These human reviewer-generated spreadsheets are also typically prepared and maintained by a plurality of individual reviewers during preparation thereof, each of whom will be responsible for a batch of files in the second data file collection. Each reviewer will then manually enter the information for their own batch or subsets of data files, which they will check out of the master collection. Practically speaking, these spreadsheets cannot be cross-referenced until the entire human review process is completed, which could effectively prevent completion of compliance-related activities in the required time period, even when the human review may have been substantially completed by the deadline. That is, sin full and complete knowledge of the content and amount of protected information associated with a data breach amount cannot be generated in prior art methods until after the end of each individual reviewer's efforts are merged, cleaned, and validated by a quality control individual(s).

Moreover, for enterprise IT networks that contain a large amount of personal information maintained in each of structured, unstructured, and semi-structured forms as appropriate in the context of disparate departments or functions, the same protected information may be maintained in a number of ways for a single entity. For example, a patient's client intake record could include a scan of her insurance card and a hand-completed medical history. This insurance card and medical history will typically be incorporated into a structured data entry form by an administrative clerk for use in generating a medical record for that patient. When the medical team examines the patient, the medical record may be generated as a combination of unstructured data (e.g., doctor's observations by text entry) and structured data entry (e.g., medical coding). The patient may communicate on her patient portal in email or chat form to her medical staff. Employees of the medical provider office or system may communicate about the patient via email; for example, a doctor might email a nurse directing her to perform some medical task for "the patient in Room 123," without using the patient's name. However, other information can allow the identity of the patient in Room 123 to be determined, thus the email would be associated with both PII and PHI for that patient. In order to identify the "patient in Room 123," it is likely that a plurality of data files would need to be reviewed and indexed to allow the identity of that patient to be obtained, thus making compliance-related activities associated with the "patient in room 123" onerous and time consuming. Of course, a data breach event will generally not involve only a single entity, meaning that similar deductive reasoning will have to be conducted for each affected patient.

The present disclosure automates at least some of the deductive reasoning needed to identify entities having data that may have been affected by a data breach, even when the name of the entity may not be uniformly provided on each of the data files, and the overall scope and content of the protected information in a collection of data files for each entity may not be determinable from a granular review of each data file.

The present disclosure incorporates a process to assist the human reviewer in aligning a plurality of data files comprising protected information with a single entity even when the entity may be identified using different entity identifications in at least some of the data files. For example, some data files may use a person's first name and last name, or just a first initial or last name. Other data files may use only a code for the person, and another data file will match list both the code and the person's name, although the name as presented in this data file may be presented as last name first, with first and middle initials. In order to properly associate the correct entity—that is, a person—with this collection of data files, the methodology herein performs an entity resolution process, As would be understood, "entity resolution" pertains to the identification and linking of different mentions of the same entity in a single data source or across multiple data sources. By way of further explanation, "entity resolution" is the merging of information in a data file with an entity when such information is determined to be associated with an entity of interest. In short, entity resolution aligns specific information in a data file with an entity. In the present disclosure, the entity to be resolved according to the processes herein are each of the persons, group of persons, organizations, or companies that are associated with each data file in the second data file such that one or more data files each comprising protected information are correctly linked to a single entity associated with the protected information.

Various methods of entity resolution can be implemented in the disclosure herein, such as that in U.S. Pat. Nos. 10,223,429 and 10,387,780, the disclosures of which are incorporated herein in their entirety.

Various entity identifiers found in a data file can be used to align or link one or more protected information data elements in that data file to a single entity. A single data file can include more than one protected information data element and/or can be associated with more than one entity identification. In a non-limiting list, these can include: full name, first name only, first initial and last name, last name only, address, IP address, email address, MAC address, date of birth, full social security number, last four digits of social security number, driver's license information without state of issue, driver's license information with state of issue, passport information, tax id number, health insurance identifiers, PIN, phone number, website passwords, bank account information, zip code, credit card number, security password (e.g., mother's maiden name, first pet, etc.), UDI, and any others that are relevant in context.

Some entity identifiers may not be unique to a single person or entity, but when combined with other identifiers, the entity can be known with certainty. In other words, a plurality of personal data elements associated with an identified entity can collectively comprise "PII," "personal information," etc. For example, names and dates of birth may be shared by more than one person. The disclosure recognizes that when resolving an entity—that is, when a name/identity is being determined from a plurality of data files—the universe of information that would be relevant thereto can be framed according to values that can be expected to be present in the data files. Such an approach can be used across to identify entities from data files associated with the enterprise that is the subject of the data breach event.

In some implementations, expected entity values can be associated with attributes such as:

Frequency—does one, few, many, or very many entities generally share the same value, e.g., an SSN is commonly used by one entity, an address is shared by a few, and a DOB is shared by many?

Exclusivity—does an entity typically have just one such value, e.g., an entity should have only one SSN or DOB, or is the value non-exclusive, e.g., an entity can have more than one credit card number?

Stability—is this an exclusive value that is generally constant over an entity's lifetime, e.g., an SSN and DOB are typically stable over a lifetime, or does it typically change, e.g., home address?

In a further example, if two persons named "Robert Smith" live at the same address but each has a different DOB, three of four entity identifiers (first name; last name; address) would be the same, but an identifier that is stable over a lifetime is different for each of these persons. Thus, a conclusion would be drawn with a high confidence that these are two different persons, likely father and son. If one man was identified as "Robert Smith" in some data files and "Bob Smith" in other data files, but the same DOB and address was present for both names in a plurality of data files, a conclusion would be drawn that these were the same people with a high degree of confidence, at least since "Bob" is known to be a very common nickname for a person with the given first name of "Robert." To this end, it would be highly improbable that two men with the same or common alternative of the same first name who share the same address would also share the same DOB. Thus, a probability can be generated that allows an entity to be identified when a plurality of data files comprise matching but not necessarily identical entity identifiers for an entity. The number of the plurality needed to generate an acceptable probability of the collection of data files conforming to the same entity will depend on context (e.g., type of identifier, commonality of identifier, etc.), and can be determined by one of ordinary skill in the art and in accordance with existing and developed rules. In implementations, a confidence level can be selected, and if the probability that the plurality of data files is associated with a single entity is below the selected confidence level, the plurality can be presented to a human reviewer for completion of the entity resolution step. The actions of the human reviewer can be incorporated into a machine learning library for use in subsequent entity resolution processes.

While at least some of the expected entity identification attributes can be pre-assigned to the entity resolution system, the system can be configured to learn more entity identification attributes over time. For example, each enterprise will likely have various conventions associated with data input formats to identify customers, patients, clients, etc. that may not be expected in the abstract but that will become apparent when data files from that enterprise are processed according to the methodology herein, especially when such data files are reviewed by a human. Such conventions can be stored for use as machine learning information in subsequent data breach review events for the same enterprise or for other enterprises, as appropriate.

An insight of the inventors herein is that as a data breach notification review progresses, the human reviewer(s) will generate knowledge about each of data file types, protected data contents, and entities associated with the first and second data collections. The human reviewers will become more competent with the data files to allow their review to be conducted more quickly. Moreover, the human reviewer validation or correction of data files will generate both more feature sets and higher confidence levels for the automated review. This ongoing human reviewer action can therefore improve the speed and accuracy of the overall review for a single data breach event.

With each data file breach review, the automated processes can also be expected to generate at least some domain knowledge for enterprises that are likely to include data files of a similar type. For example, if a data breach event file data collection review is conducted for a hospital system, it can be expected that the automated processes can provide an improved first order review of data file collections for another hospital system. Over time, the systems will generate at least some domain knowledge for businesses that are associated with the same type of data collection operations. The machine learning libraries generated from one or more enterprise IT network breach events can therefore be used in a subsequent breach event data file review.

A further aspect of the methodology herein includes a functionality that assists a human reviewer in her review activity. This functionality is operational in the background during the human review process, and incorporates actions and insights generated from each of the human reviewers, where such actions and insights can be incorporated into the processes as the review of the batches or subsets of data files are reviewed by each of the human reviewers. When a new data file in the second data file collection is reviewed by a human reviewer and the reviewer identifies relevant information on that data file (e.g, name, SSN, DOB, etc.), the system is configured to analyze previously reviewed and indexed data files to see if any of that same information has already been incorporated into the database incorporating previously reviewed data files where such review has been completed. If a previously identified entity is determined to be the same as an entity associated with the present data file review, the data file information will be linked with the existing entity information and associated protected data automatically so that all protected information known to be associated with a previously identified entity can be grouped together for all of the data files in the second data file collection having that same entity identification for each of the batches for each human reviewer. If any protected information that is now linked to a known entity was not previously associated with an entity, that previously unaffiliated information will now be grouped automatically with the known entity in real time. For example, medical information could have been in a data file with only a number as an entity identification. In a later reviewed data file, the number appears along with the person's name. The numbers in each data file can then be linked to the person, and any protected information in the data files will now be associated with that individual by name. Further, if information was previously grouped with another entity such that there is now more than one entity grouped with the same protected information, such information will be flagged for additional review.

Information associated with entity groupings and any corrections related thereto can be incorporated into the processes herein. In this regard, context associated with the linkage of data files to an entity (e.g., person(s), company, organization etc.) or entity category (e.g, customer, patient, client, etc.) can be incorporated into the processes to further improve the machine learning for this project and others, such as by enhancing the ability to extract useful information out of unstructured and semi-structured data.

It should be appreciated that because the database is generated throughout the data file review process, the effort required to create an accurate compliance-related database can be greatly lessened in comparison with prior art methodologies. To assist with compliance-related database completion, the system can be configured to allow the user interface to allow not only for data file review and exploration, but also to allow review and editing of the entities/individuals affected by the data breach event during the compliance-related database generation in real time. In this regard, the system can be configured to display all identified information generated for each individual/entity identified from the data files as being affected by the data breach, including all personal information, related or duplicate individuals, and related data files. Such "unified view" can be generated during human review to provide a real time assessment of the scope and content of the protected information associated with an identified entity during the review process. It is expected that by allowing a human reviewer to observe the entity resolution process and any protected information and linking associated therewith as the process is ongoing can serve to reinforce the understanding of the human reviewer of the generated compliance-related output in context. That is, rather than being conducted in a vacuum, the human reviewer can gain increased understanding of the process in real time. This can result in the human reviewer being able to more quickly conduct the review as she becomes more knowledgeable about the process in context (e.g., repeated occurrences of a name and address for a person can be accepted more quickly, nicknames, etc.), she can also be better able to identify anomalies in the data (e.g., a misspelling in a name or address, married name vs. married name, transposed SSN etc.).

Yet further, the human reviewer can be provided with a unified view of the entities and linked protected information at the end of the review process. As would be appreciated, at the end of the review process, a unified view of the entirety of the data files having protected information for each identified entity will be appropriate for addressing compliance-related activities for that identified entity as appropriate for that specific entity. The human reviewer, who at the end of the process should have a deep understanding of the information developed during her work, can review the compliance-related database section that she generated as a quality control check.

The system can further be configured with additional functionality associated with entity resolution. For example, the system can employ data provided by the enterprise to enhance the knowledge base included in the system at the front end. The enterprise can provide lists of known persons who are likely to have been associated with protected information. If a portion of an e-commerce website's stored credit card database is hacked, the e-commerce business can provide a database of known customer information to populate the system knowledge base. Sources of data, such as HR directories or customer relationship management databases can be imported into the systems to assist in entity resolution, such as by confirming contact information. As would be appreciated, having such information to seed the machine learning libraries can improve accuracy of the automatic searching and identification using the methodology.

Still further, the entity resolution engine can learn from human reviewer interaction and use this information as training in machine learning systems to identify when multiple pieces of information may belong to the same person, even if a human reviewer has not previously found this particular person's information. For example, in an email from Todd to John referencing Peter, his date of birth, and his SSN, the system can be configured to recommend to the human reviewer that Peter has multiple pieces of information in the data file. The technology described herein can be used to automatically build out the entity list. Likewise, the system can be configured to assist a human reviewer in mapping entity and protected data to the laws, regulations, policies, procedures, and contractual obligations thereby significantly reducing the manual entry effort.

A further significant implementation of the present disclosure is an automated data file identification and description process that reduces the time needed to review each of the data files in the second data file collection, which can be highly relevant to compliance-related activities that are, in many cases, subject to strict deadlines. This automated process also can reduce input errors and enforce consistency among human reviewers at least because the format for data entry is standardized by data file rules defining the highlighting of the identified portions of each data file. This standardization can also be useful to reduce the time needed to complete the compliance-related database due to the consistency forced between human reviewers that substantially eliminates the ability of a reviewer to generate her own "flavor" of data entry.

Known functionality and formatting of data files can be leveraged to enhance the ability to derive information therefrom automatically or at least with reduce the need for manual effort. For example, when a data file is identified as being a PDF, form extraction can be used to identify fields in the subject data file to provide information about the subject matter of any text entry therein. The text in a field identified to be associated with protected information can also be automatically derived from the PDF document (e.g., fields identified as PII entries: SSN, name, DOB, etc.).

In another example, metadata associated with data files can be utilized to provide insights into whether a data file may (or may not) be likely to include either or both of information about an entity that may be affected by a data breach or protected information. As an example, image data files generally include both content-related metadata and location-related metadata. One or more image metadata types can be automatically reviewed to identify multiple occurrences of the same image that can be identified with high confidence as not comprising protected data (e.g., logos, memes, etc.). Similarly, image metadata can be automatically reviewed to identify image data that is likely to comprise protected data. For example, a plurality of images that have location data associated with the GPS coordinates of a hospital can be identified as having a higher probability of comprising at least some protected data. In another example, content metadata in data files can identify an author, editor, etc. If the person or department indicated in the content metadata can be determined to be associated with a person who is known to commonly be associated with protected data creation (e.g., a medical provider, a lawyer, etc.) that data file can be identified as likely comprising protected information. If a data file is identified as having a high probability of comprising protected information, the human reviewer can be provided with information related thereto. In some situations, it may also be possible to accurately identify a data file as having protected information therein by identification of the information therein by methods such as field identification for PDF data files, optical character recognition, application of training sets where protected information has previously been identified, pattern matching etc. If such protected information can be identified from the data file automatically and the system can determine that such identification is made with a high degree of confidence, the human reviewer can be provided with information in that regard. In some situations, such as with multiple occurrences of human reviewer confirmation of the system correctly identifying the content of a data file type, the system can automatically generate the protected information determination, which can from time to time be subject to human review to ensure that the automatic identification continues to be correct.

In a first implementation of the automated data file identification and description process, the system is configurable to automatically highlight relevant information detected in a data file, where the detected information is associated with an entity and/or protected information that is present in the subject data file. Once highlighted, the human reviewer can review the highlighted section(s) in the data file and, if she accepts the automated identification as being correct in the context of the subject data file, as well as in the ongoing second data file collection review, she can select the highlighted section(s), such as by clicking a mouse or using a touchscreen interface. The entire highlighted section can then automatically be incorporated into a database record associated with the data file. If the human reviewer does not agree with the automatically highlighted sections(s), she can reject the highlighted portions, and optionally manually input a reason for the rejection, as well as any relevant corrections. The actions of the human reviewer with regard to the automated identifications can be recorded as information for use in data file review for the same enterprise IT network, as well as to train machine learning processes used for other enterprise IT networks.

The sections in the data files displayed to the human reviewer can be highlighted according to a standardization by color coding for the automated data file information type suggestions. In this regard, an identified entity name can be highlighted as a first color, a credit card as a second color, a SSN as a third color, etc. Once the human reviewer becomes familiar with the color-coding framework, the reviewing process can become faster.

In a second implementation of the automated data file identification and description process, entry of information included in data files that comprise a large amount of similar information can be automated so that the human reviewer does not need to separately identify the unique data for inclusion in the compliance-related database. When the human reviewer is presented with a structured data file that includes a plurality of names, such as patient names, SSNs and DOB's, the system is configurable to automate the entry of such information into the compliance-related database. In this regard, the human reviewer can select each of the columns and align such information with the associated compliance-related database columns. As would be appreciated, such an automated database population can greatly reduce the amount of time needed to populate the compliance-related database, as well as increasing the accuracy of data entry. Again, the actions of the human reviewer can be recorded as information to be used in machine learning processes so that the next time a similar data file is identified in the second data file collection, the system can provide the proposed action of auto-population of the compliance-related database as a suggested action to the human reviewer.

In a further example, for data files comprising tables, the information therein can be automatically extracted to populate the compliance-related database. Such tabular data can be embedded in a data file, such as an email, PDF, or the like: in other words, the system is configured to process structured data that is embedded in unstructured data. The system can automatically extract the tabular data to identify the protected data elements therein and identify and associate any entities therewith. In contrast to prior art data file review methods, the methodology herein does not treat tabular data as information without context as a "bag of words" where the tabular content is extracted, indexed, and then automatically reviewed. The methodology herein is configured to identify tabular data in a data file, identify one or more relationships between and among the tabular data, and associate the tabular data with the identified relationships. The system can then extract the tabular data along with the identified relationships. The system can be configured to identify the nature and content of the data and to extract any relationships therefrom. In some implementations, the methodology can be configured to generate structured tabular data from unstructured tabular data.

As would be appreciated, the first time the automated system encounters a data file where the unstructured tabular data is embedded in an unstructured file, the nature and contents of such file may be difficult to analyze. Thus, such a file may likely be presented to the human reviewer. Once such a document is manually reviewed, the output of the human review will then be included as a feature set in machine learning systems. Over time, automatic review of such data files can be conducted with high confidence to further reduce the manual work needed for data file review.

In a further implementation of the automated data file identification and description process, once a human reviewer selects a combination of information in a data file from her display, the system can be configured to automatically review the other, not yet reviewed, data files in the second data file collection to identify any appearance of that same combination in the not yet reviewed data files. To this end, data files generated by the same enterprise will often have a standard data entry format that is unique to that enterprise. It can be expected that a second data file collection derived from a data breach event will comprise data files from one or more areas/departments of the enterprise having similar data entry conventions. The generation of the compliance-related database can be streamlined and accuracy improved when such data entry conventions are identified in the second data file collection and automatically propagated through other data files therein having the same data combinations.

Yet further, a functionality of the methodology herein is the ability to detect anomalies, such as irregularities in text. An example of an anomaly of interest would be when two entities are identified as having the same identifying information, when such persons should not. Using the father and son "Robert Smith" example previously discussed, if the name "Robert Smith" living at the same address is associated with two different DOBs, a potential anomaly will be presented to a human reviewer for validation or correction. Anomaly detection functionality may also be relevant when two occurrences of identified protected information associated with an entity are very similar, such as might occur with a typographical error. In this regard, when an entity has more than one data file from which the entity identification is generated, anomaly detection functionality reviews the information associated with the entity identification and each of the data files that the entity information is associated with to determine which piece of information is likely to be more accurate. For example, if an identified entity is associated with a SSN of 231-09-0998 that is derived from eight data files and a SSN 231-09-0999 that is derived from one data file, anomaly detection will analyze the number of data files associated with each SSN to help determine which SSN most probably belongs to the entity in question. A suggestion for the correct SSN can be made to the human reviewer for confirmation thereof.

To ensure that all protected information was identified in the first data file collection, a second automatic protected information search can be conducted thereon later in the review process. In some implementations, it can be beneficial to conduct such automatic review at the end of the review, as it can be expected that at that point the processes will include significantly more training sets and other learning that can enhance the automatic search capability to ensure that data files previously identified as not including protected information in fact do not comprise protected information. This can serve as a double check on accuracy of the compliance-related database.

Instead of generating the notification database from a collection of a plurality of individual reviewer spreadsheets or other type of database entries after each of the individual tasks are completed for each reviewer, the systems and methods herein generate the master compliance-related database from a collection of reviewer database entries where each reviewer contributes thereto as the compliance-related database is being generated. In other words, unlike with prior art methods where each human reviewer creates an independent compliance-related database portion from her own review activities followed by merging of each independent reviewer compliance-related database, the present methodology automatically creates a master compliance-related database that where each reviewer effectively collaborates. By such collaboration, any new database generation activities by each of the plurality of human reviewers, as well as any automated activities associated therewith, can be incorporated in the compliance-related database preparation in real time. Such real time collaboration has the benefit of allowing at least some entity resolution activities to be conducted in real time while the compliance-related database is being prepared, such as by reducing the need of each individual reviewer to independently perform entity resolution activities. Further benefits to this collaboration are provided by the ability for one or more individual reviewers to identify potential errors in entity resolution activities to be flagged for other reviewers in the group of reviewers so that such notification of potential errors can be propagated amongst all the reviewers. Such collaboration is akin to the "wisdom of crowds," wherein the "crowd" is the group of individual reviewers and the "wisdom" is the collective generated knowledge of the group, to enhance the accuracy and speed of compliance-related database preparation so that compliance-related activities can be effectively performed from such output. The processes herein can be considered to provide a methodology that allows the compliance-related database entries to "self-correct," in that errors or omissions in the data identifications and entries can be automatically generated in the database record substantially without manual corrections.

The process also provides a collection of database information for each entity identified in the review process. The collection of information available for each identified entity can comprise at least all protected information identified for each identified entity that was associated with the data breach event, related or duplicate entities identified, and data files associated with each identified entity that do not comprise protected information. A level of confidence can be presented for each data file associated with an identified entity and/or related or duplicate individuals, where the level of confidence can serve as a way to identify compliance-related database information that should be manually checked for accuracy. Any information associated with a human reviewer's identification and operation of correction and accuracy checks of one or more compliance-related database entries can be stored in the machine learning library for subsequent use, thereby improving the accuracy of subsequent reviewing activities.

The generated compliance-related database can then be used in compliance-related activities associated with a data breach event. In this regard, the compliance-related activities can comprise one or more of receiving a plurality of compliance-related requirements associated with a data breach event, determining whether one or more of the plurality of compliance requirements are relevant to one or more of the entities in the compliance-related database, and performing compliance-related activities associated with each to the identified entities.

As would be appreciated, whether each of a plurality of compliance-related activities is relevant to an identified entity will depend on the location/citizenship/residence of the entity, the data files associated with the identified entity, and the regulating body associated with a laws, rules, regulations, policies, or contractual obligations, among other things. In this regard, some states will not require notification to either or both of each identified entity and the regulator or will otherwise impart liability for a data breach at any time, whereas some states may require notification of a data breach to affected entities within a short period of time. For the EU, the GDPR requires notification within 72 hours of the breach notification to all affected entities for any data breaches involving "personal information" as identified in the regulation. The wide variety in not only jurisdictions but also in the nature and scope of compliance-related activities associated with a data breach notification—as well as any penalties or liability for non-compliance thereto-thus requires contextual assessment of the compliance-related database as to identified entity, location/residence of the identified entity, and the content of each data file associated with the identified entity.

The present technology can also provide a risk assessment based on the nature and scope of a data breach as shown by a compliance-related database. These risk assessments provide specific information to an enterprise regarding the severity of the data breach relative to applicable laws, rules, regulations, policies, or contractual obligations. The data risk assessment can provide information associated with the level of protected information associated with the data breach. For example, the manager of the enterprise IT network can be presented with a dashboard configuration that provides a comprehensive overview of the affected identified entities by department, customer type, customer location, employee, patient(s), type of customer data files associated with the data breach, etc. The dashboard can be color coded to indicate the severity of the data breach in various contexts. Such information can be consolidated into a report form or otherwise used for "after action" activities associated with compliance-related activities.

In further implementations, the systems and methods herein can be configured to generate automatic notifications of the data breach to each identified entity as required by each applicable laws, rules, regulations, policies, or contractual obligations. In this regard, a reporting obligation associated with an identified entity is determined for an identified entity, where the reporting obligation is derived from at least the applicable laws, rules, regulations, policies, or contractual obligations, the residence, location, or citizenship of the identified entity, and whether protected information for the identified entity was present in or can be derived from the data files associated with the identified entity. If a reporting obligation is present, the system is configurable to provide such automatic notification via letter using address information derivable from the compliance-related database. If a return notification is obtained (e.g., via returned letter, "bounced" email), such information can be used to update the compliance-related database and other information associated with the identified entity.

Figure 1B:
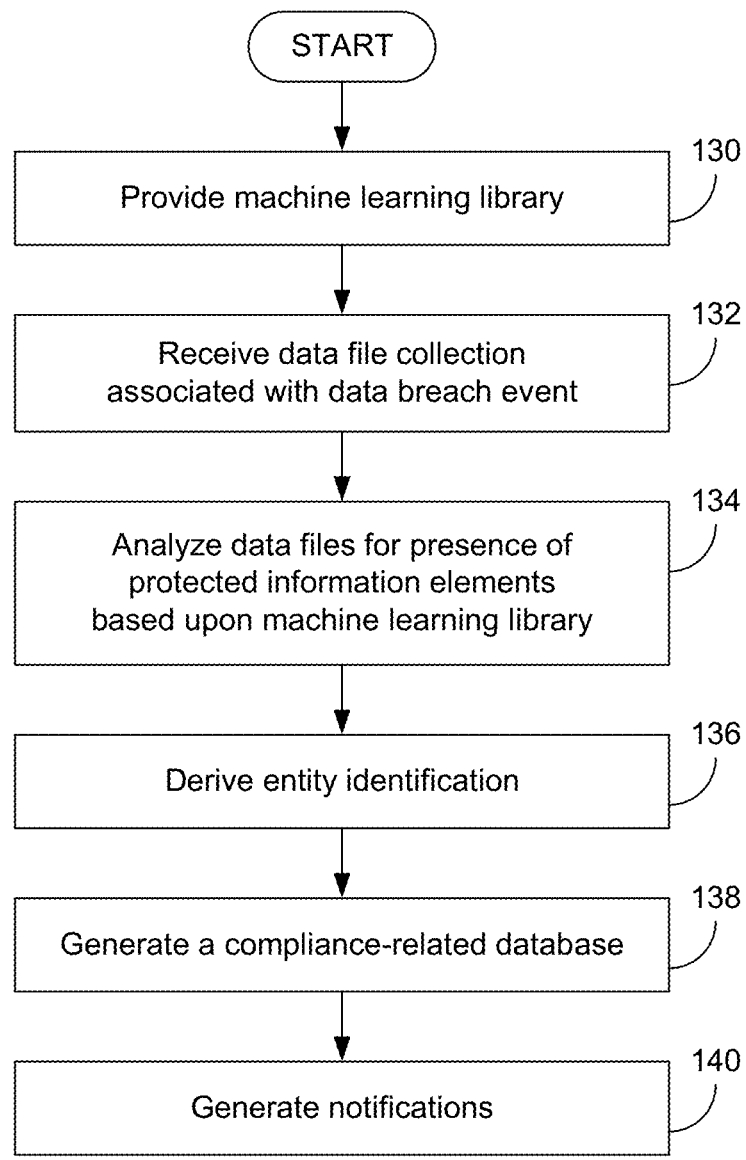

Referring now to FIGS. 1A and 1B, shown are flow charts illustrating examples of identification and management of compliance-related activities after a data breach associated with an enterprise IT network. Beginning at 102 of FIG. 1A, a (first) date file collection associated with a data breach event is received by at least one computer (e.g., a server or cloud computing system). The data file collection can be generated by analysis of the data breach event. For example, the data file collection can be derived from a bulk data file collection stored on or associated with an enterprise IT network of interest for monitoring for an occurrence of data breach events. The first data file collection can comprise at least some of structured, unstructured, and/or semi-structured data file types. At least some of the first data file collection can include protected information having compliance-related activities associated with in.

Information associated with the protected information elements can be generated for all or part of the data file collection by the at least one computer at 104. The information can be associated with the presence or absence of the protected information elements. If the generated information indicates that a data file in the data file collection includes the protected information elements, that data file can be incorporated in a second data file collection thereby generating a second data file collection at 106. Data files of the second data file collection can then be analyzed by, e.g., a human reviewer to validate whether the data file comprises one or more of the protected information elements. For example, a subset of individual data files selected from the second data file collection can be analyzed to validate that each data file in the subset comprises at least one protected information element.

If it is determined at 110 that the one or more protected information elements are not present in a data file, then that data file can be removed from the second data file collection e.g., by the human reviewer, and re-incorporated into the first data file collection at 112. If it is determined at 110 that the one or more protected information elements are present in a data file, then at least one entity identification for an entity associated with the protected information elements in that data file can be derived at 114 by either or both of the human reviewer or the at least one computer. The entity can comprise an individual, a group of individuals, an organization, or a company. Based the protected information elements and associated entities, information associated with one or more protected information elements and the associated entity can be generated at 116. The information can be generated by either or both of the human reviewer or the at least one computer.

At 118, the information associated with the analysis of the subset of individual data files can be incorporated into machine learning information by, e.g., the at least one computer. The information can be stored in, e.g., a machine learning library at 120 and configured for subsequent analysis of either or both of the first and second data file collections. The information in the machine learning library can also be used for analysis of other data file collections, which can be associated with the same data breach event or another data breach event.

For example, at least one computer can provide a machine learning library at 130 in FIG. 1B. The machine learning library can be generated using, e.g., the method of FIG. 1A. At 132, a data file collection associated with a data breach event is received. The data breach event may be associated with the data breach event used to generate the machine learning information of the machine learning library or with another data breach event. The data files of this data file collection can be analyzed at 134 for the presence or absence of protected information. The analysis can be based, at least in part, upon the information in the machine learning library. Entity identification can then be derived at 136. A compliance-related database can be generated at 138 based upon the analysis. The information in the compliance-related database can be used to generate notifications associated with the data breach even at 140, which can then be provided to the identified entities.

Figure 2:
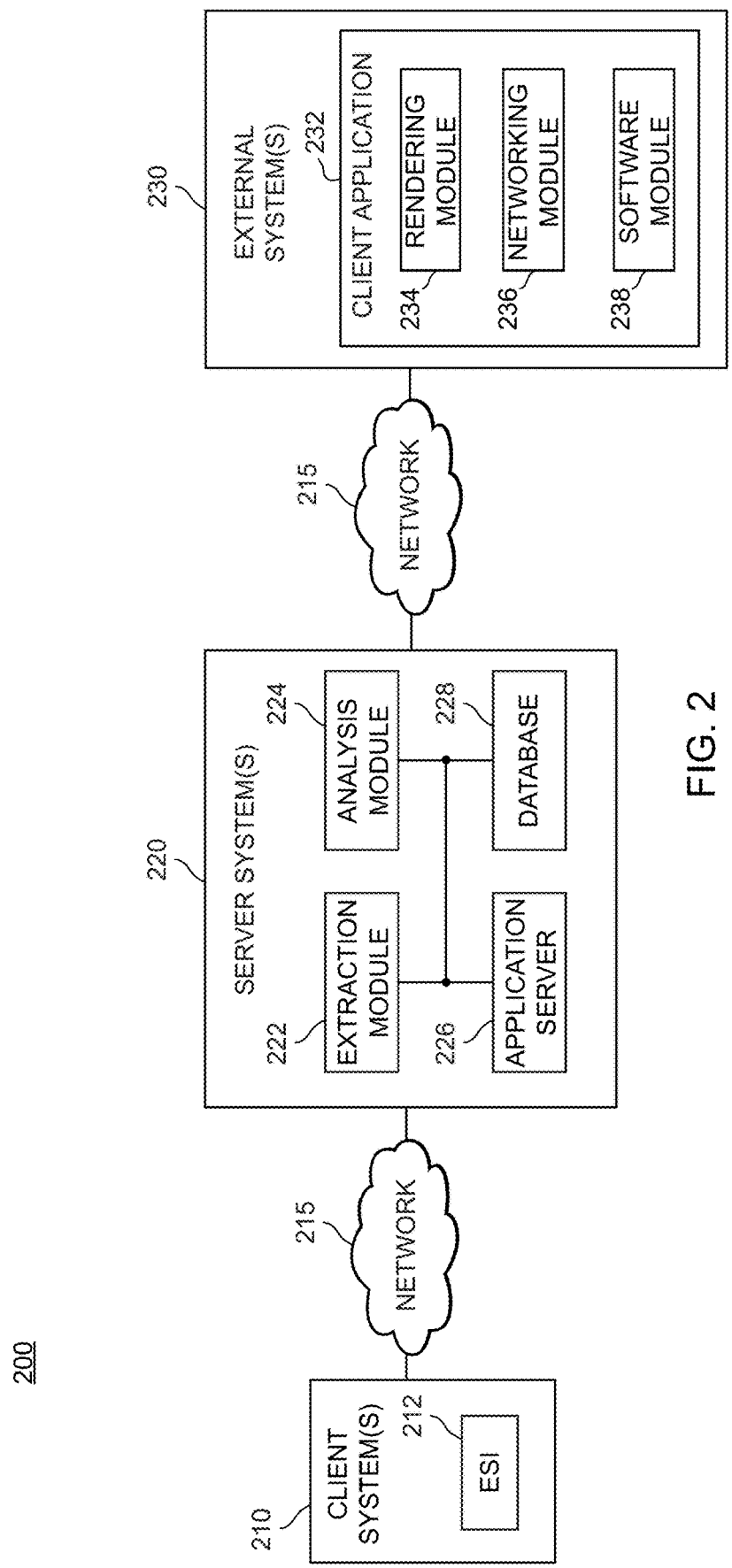
FIG. 2 is a block diagram illustrating an example of a system for implementing the management of the compliance-related activities, in accordance with various implementations of the present disclosure.

FIG. 2 shows a block diagram illustrating an example of a system 200 wherein the framework for processing electronically stored information (ESI) such as managed data (e.g., structured data, unstructured data, and/or semi-structured data) and generating a user interface can be implemented. One or more applications can be executed to implement the framework for processing ESI and generating the user interface in the system 200, and the various components in the system 200 (such as the client system(s) 210, server system(s) 220, and/or external system(s) 230) can perform different functions related to the deployed applications. In one non-limiting example, the external system(s) 230 may generate a user interface showing information related to the processed ESI so an end user may make an informed decision regarding the use of such information.

Figure 4:
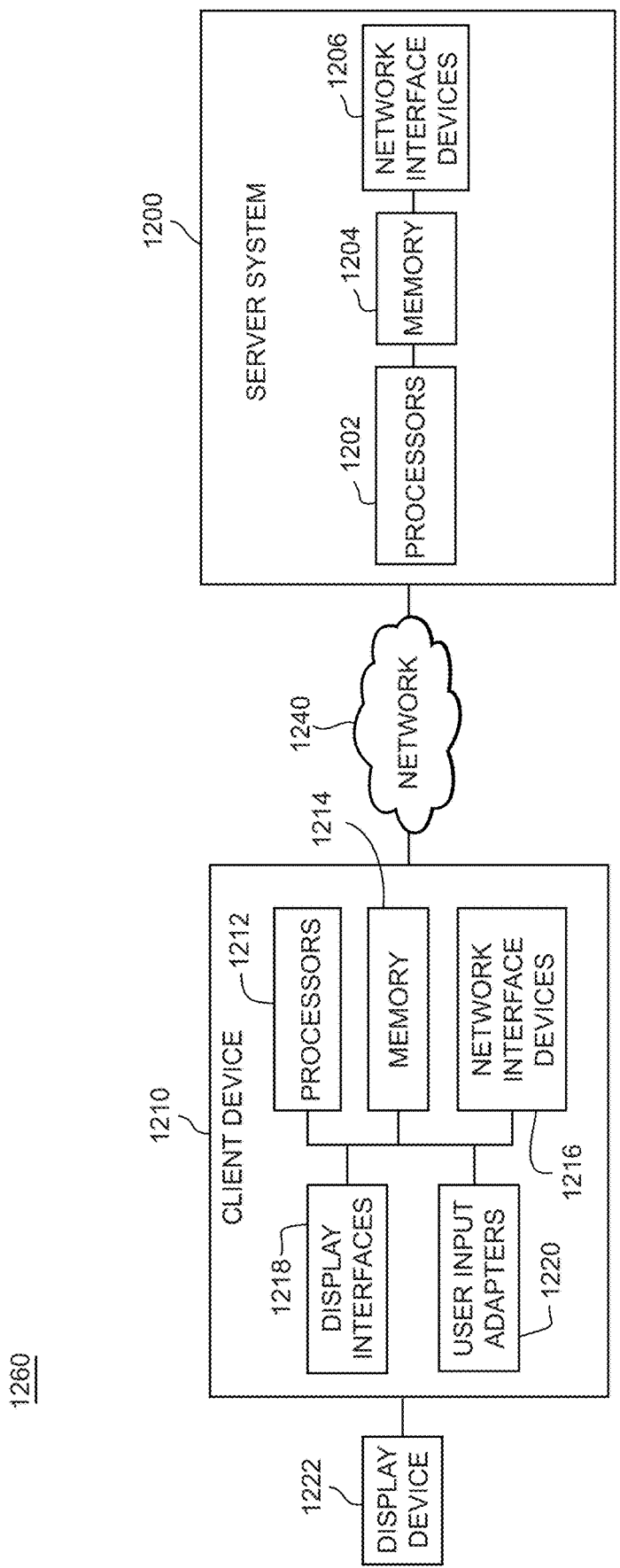
FIG. 4 is a block diagram illustrating examples of hardware components of the system, in accordance with various implementations of the present disclosure.

FIG. 2 shows applications or software modules that can be executed by processing circuitry at the external system(s) 230, server system(s) 220, and the client system(s) 210; it should be understood that the applications or software modules shown in FIG. 2 are stored in and executed by hardware components (such as processors and memories) and processing circuitry; details regarding example hardware components that may be used to execute these applications or software modules are provided below with reference to FIG. 4.

One or more client system(s) 210 can be configured to store ESI 212 having managed data can comprise each of "structured data," "unstructured data," and "semi-structured data or other information related to one or more topics. The ESI 212 can be an electronic data message and/or a data file formatted for processing by server system(s) 220. For example, the ESI 212 can include, e.g., email messages, word processor documents, spreadsheet documents, electronic presentation documents, images and/or portable document format (PDF) documents. These examples are of course non-limiting and the technology described herein envisions ESI 212 taking any variety of forms.

Server system(s) 220 can be configured to communicate with client system(s) 212 and external system(s) 230 (e.g., via network 215). It should be appreciated that the network 215 can comprise a network of interconnected computing devices, such as the Internet. The network 215 can also comprise a local area network (LAN) or a peer-to-peer connection between the different devices in the system. The server system(s) 220 can comprise one or more computers, computing devices or server devices including, but not limited to, database servers, file servers, web servers, application servers, a server cluster (e.g., a cloud based computing environment), a standalone server, and/or any other portable or stationary computing device having server-based capabilities. It should be appreciated that the server system(s) 220 can be implemented using separately located hardware (e.g., remote hardware) or can be implemented using a same piece of hardware (e.g., within a single housed server device).

Server system(s) 220 can receive the ESI 212 from client system(s) 210 via network 215. Upon receiving ESI 212, an information extraction and analysis application can analyze data files to generate information related to protected information elements. For example, the extraction module 222 of server system(s) 220 can be configured to parse different elements in the ESI 212. For example, extraction module 222 may parse word processing documents or email messages for various data and then provide the parsed and extracted data to analysis module 224. In one non-limiting example, analysis module 224 can analyze the parsed and extracted data to look for certain information that may be considered sensitive and open to being compromised. As an example, analysis module 224 can analyze the data to associate different individuals or entities with certain personal information elements including, but not limited to, social security numbers, personal address information, credit card information, sensitive health information, and/or bank account information.

Once a data file has been extracted and/or processed, the system(s) 220 can store the extracted and processed data in database 228. The database 228 can be or include one or more of: a relational database management system (RDBMS); an object-oriented database management system (OODBMS); an object-relational database management system (ORDBMS); a not-only structured query language (NoSQL) data store; an object cache; a distributed file system; a data cluster (based on technology such as Hadoop); and/or any other appropriate type of data storage system).

The server 220 can further include an application server 226 that can, for example, execute server-side (or "back end") instructions for applications that run on the server system 220. In one non-limiting example, the application server 226 can generate data associated with a user interface that is displayable on a display connected to external system(s) 230.

The external system(s) 230 can include software components for performing processing related to applications deployed in the system. As a nonlimiting example, the external system(s) 230 may have a client application 232 comprising a rendering module 234, a networking module 236 and a software module 238. Of course, these modules are a non-limiting example, and the client application 232 can comprise several more modules and/or different modules than those illustrated in FIG. 2. The external system(s) 230 can comprise any variety of client-based devices including, but not limited to, a personal computer (e.g., a desktop computer, a laptop computer), a thin client, a hybrid client, a rich client, a game console, a tablet, a personal digital assistant (PDA), a smartphone, a digital music player having web interface capabilities, and/or any other portable or stationary computing device.

The rendering module 234 in the external system(s) 230 can implement functionality for the graphical display and rendering of user interfaces. It can, for example, generate graphical data that corresponds to an image class that represents graphical images processed by the client application 232; this graphical data can, potentially after further modification and/or transformation by the operating system of the external system(s) 230, be displayed on a display of the system(s) 230. Alternatively or additionally, when the external system(s) 230 renders/displays image data, the rendering/displaying module 234 may perform functionality related to the rendering/display of the image data.

The networking module 236 can implement a communication protocol, and be used to handle various data messages between the external system(s) 230 and, at least, the server system(s) 220. In one non-limiting example, the networking module 236 may carry out a socket connection by using a software connection class to initiate the socket connection between devices. Once the sockets are connected, networking module 236 may transfer data to/from the server 220.

The software module 238 can be used to execute various code loaded at the client application 232, and perform other functionality related to the application software. The software module 238 may be, for example, a Java runtime engine or any other type of software module capable of executing computer instructions developed using the Java programming language. This example is of course non-limiting and the software module 238 may execute computer instructions developed using any variety of programming languages including, but not limited to, C, C++, C #, Python, JavaScript, or PHP. Alternatively or additionally, when the external system(s) 230 performs functionality related to the software module, such functionality may be handled by the software module 238.

It should be appreciated that the components shown in FIG. 2 can be implemented within a single system. The components could also be incorporated in multiple systems and/or a distributed computing environment (e.g., a cloud computing environment). Thus, the system is not limited to a single component and can be incorporated into multiple components.

FIGS. 3A-3M show non-limiting example user interfaces 300 that are operational with the methodology herein. In this regard, user interfaces 300 show non-limiting implementations of search result arrangements that can be displayed to a human reviewer during a data file review.

Figure 3A:
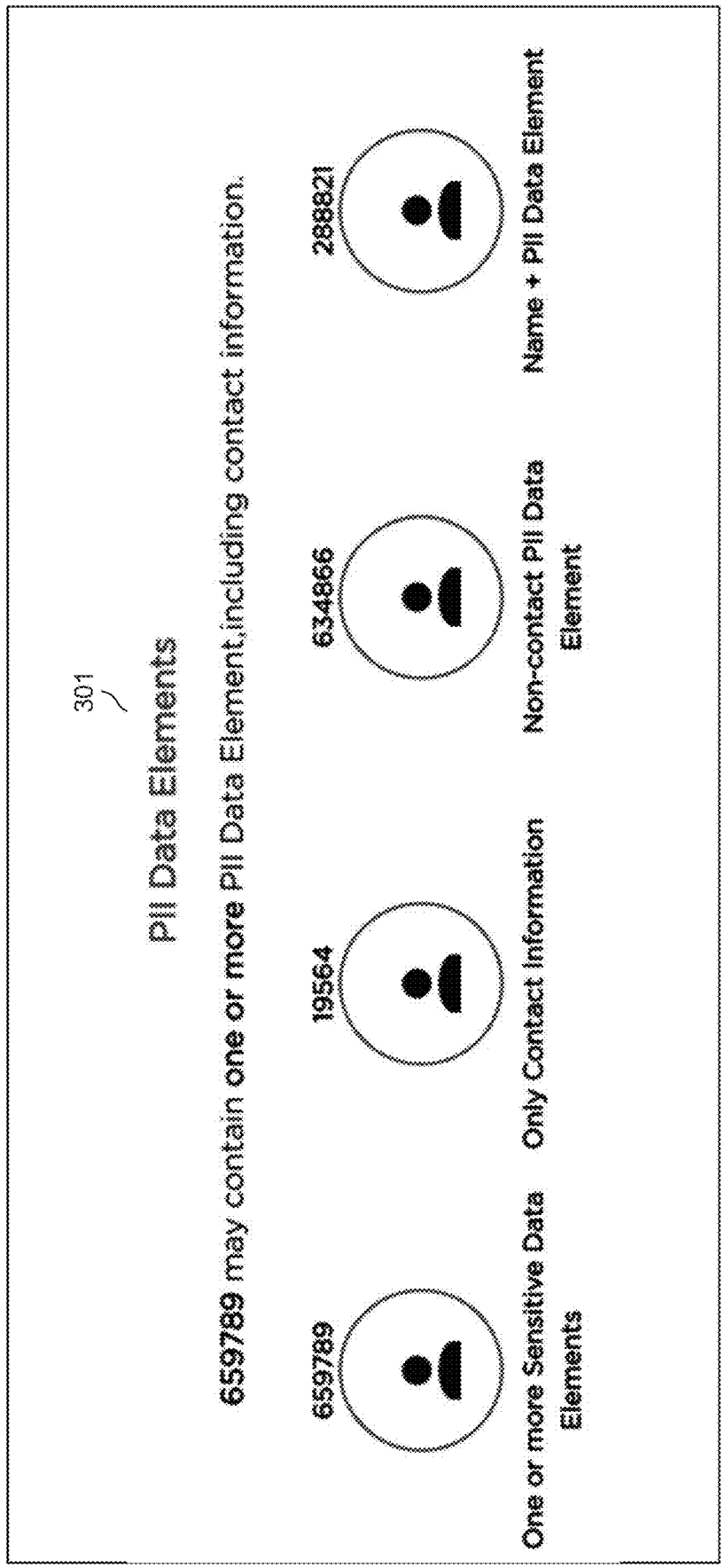

FIG. 3A specifically shows summary items 301 of different PII elements automatically identified from a first data file collection. For example, user interface 300 can show summary items 301 indicating an overview of data files containing different PII elements identified from the first data file collection derived from the digital forensic analysis of a data breach event that can include, but are not limited to, one or more personal data elements, only contact information, non-contact PII data elements, and name+PII data elements (with each summary item 301 including an associated number with each of these categories).

Figure 3B:
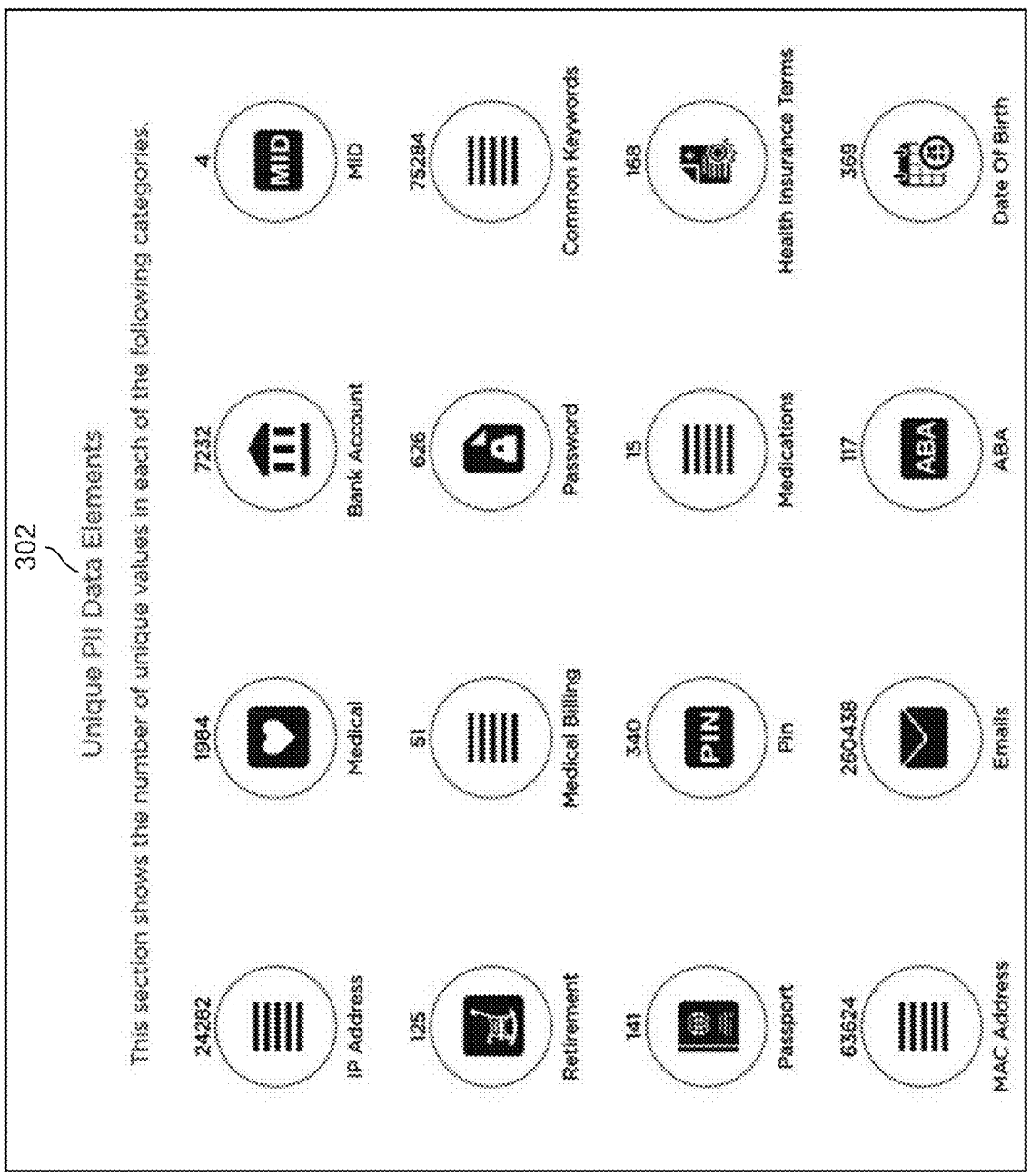
Figure 3C:
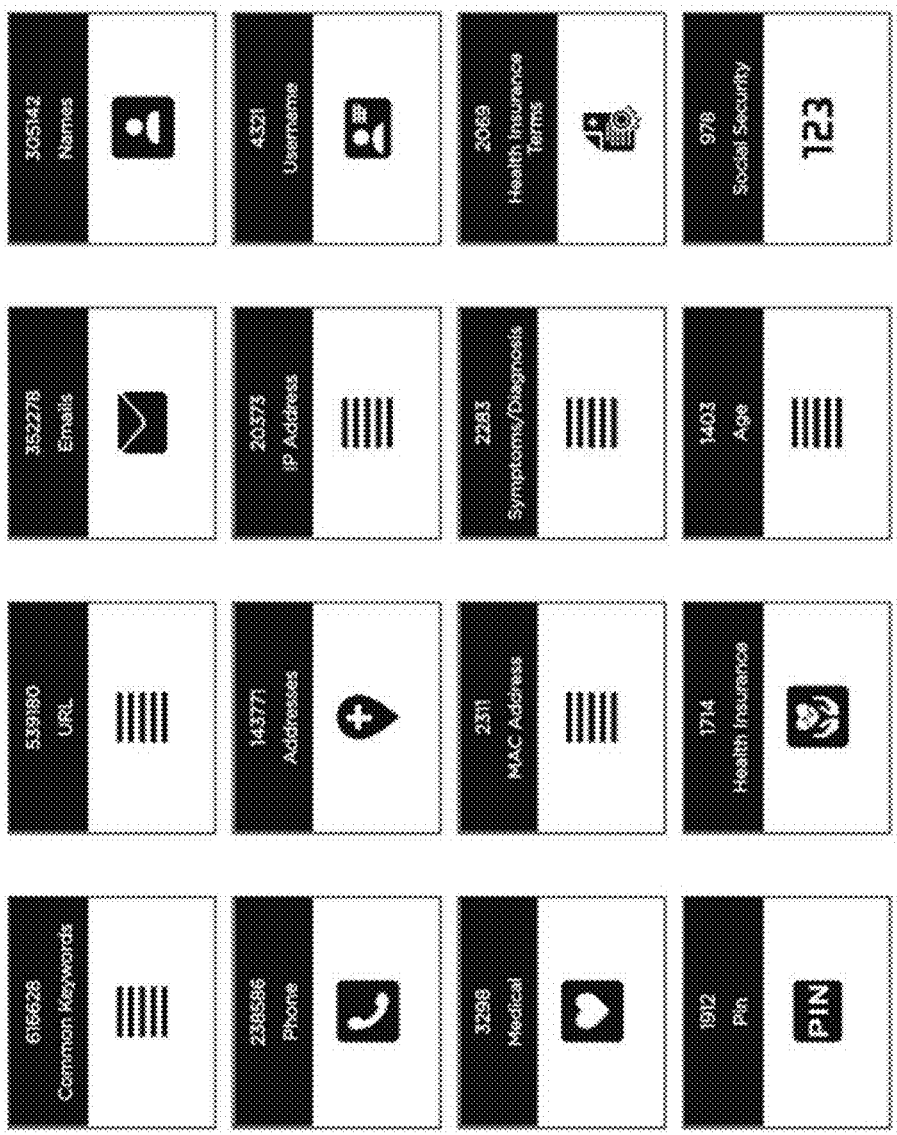

FIGS. 3B and 3C show further example user interfaces 300 providing further detailed information that expands on the summary items 301. FIG. 3B specifically shows an example user interface 300 containing unique PII data elements 302 showing the unique pieces of information for each different PII. For example, unique PII data elements 302 may include an indication of 141 passport identification numbers found in the data files, while also showing an indication of 340 user PIN numbers found in the data files in the automatic analysis of the first data file collection. FIG. 3C shows a data file breakdown 303 of the data files containing PII data. For example, user interface 300 shown in FIG. 3C may indicate that 1912 data files contained PIN information, while also indicating that 978 data files included SSNs. These user interfaces 300 advantageously give the human reviewer instant insight into the number of affected data files and individuals within the data file set and allows them to generate insights about the size and scope of the data breach review process to, for example, generate a staffing plan for the review and to predict the time needed to appropriately act on compliance-related activities associated with the data breach event.

Figure 3D:
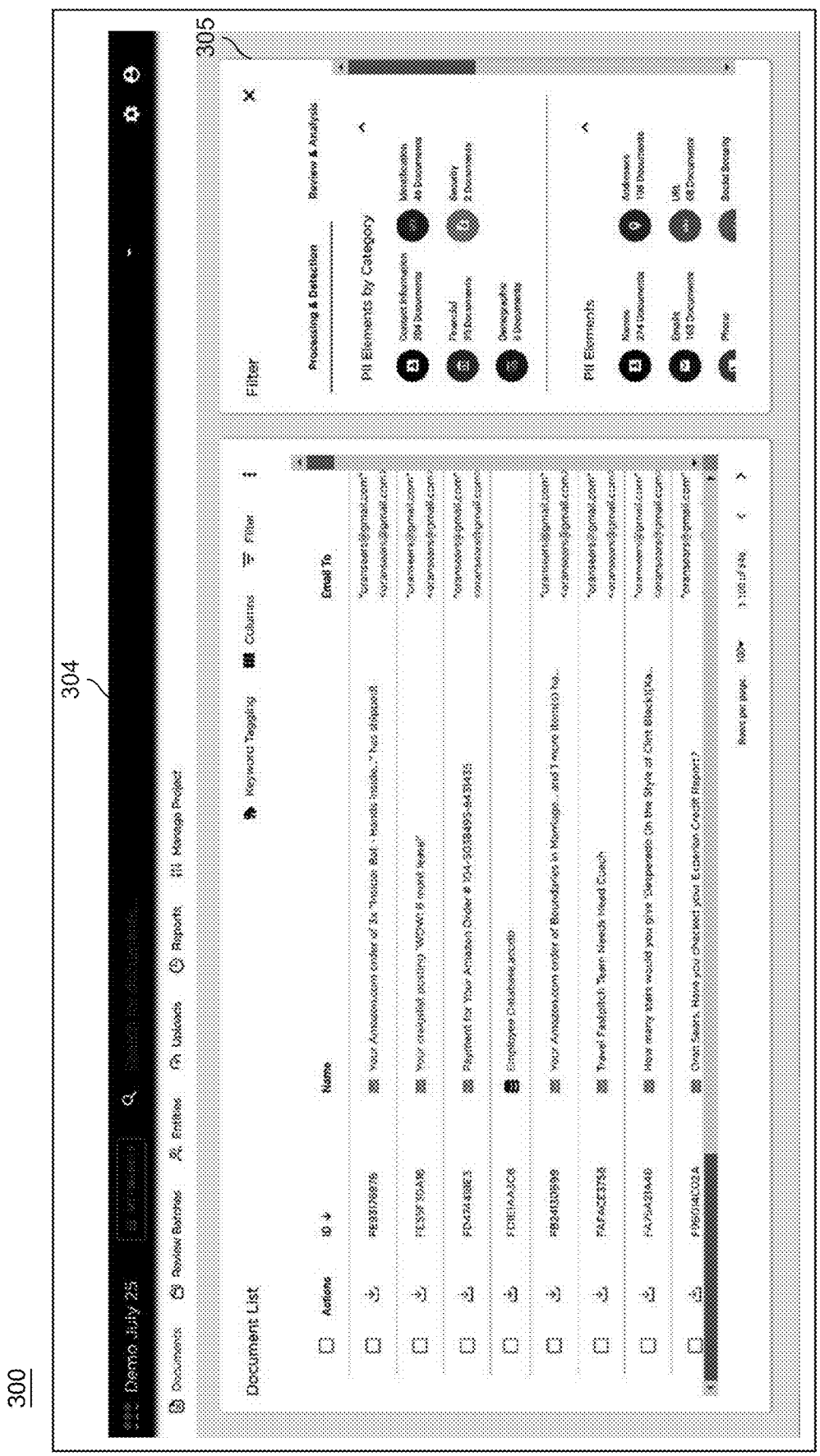

FIG. 3D shows another example user interface 300 including a filtering window 304 for filtering one or more data files for review. In one non-limiting example, filtering window 304 may include a filtering pane 305 allowing a user to filter data files by different elements incorporated therein as determined by the automatic review of the first data file collection. For example, filtering pane 305 may include options for filtering PII elements by category, by specific PII elements, and/or file types, among others. Some of these aspects of the user interface may be associated with a plurality of data analysis methodologies that are relevant in the context of the data file review as being conducted. For example, the human reviewer may be tasked with determining whether any of the data files contain personal information associated with a plurality of types of personal information that might be relevant to a plurality of applicable laws, regulations, policies, procedures, and contractual obligations for which compliance-related activities need to be conducted as a result of the data breach event.

FIG. 3D shows an example where, as a human reviewer views data files, she may begin to formulate a review plan for the collection of data file assigned to her. The human reviewer can filter in data files of interest to the one or more laws, regulations, policies, procedures, and contractual obligations relevant to the data breach event, and remove data files that are not relevant.

Figure 3E:
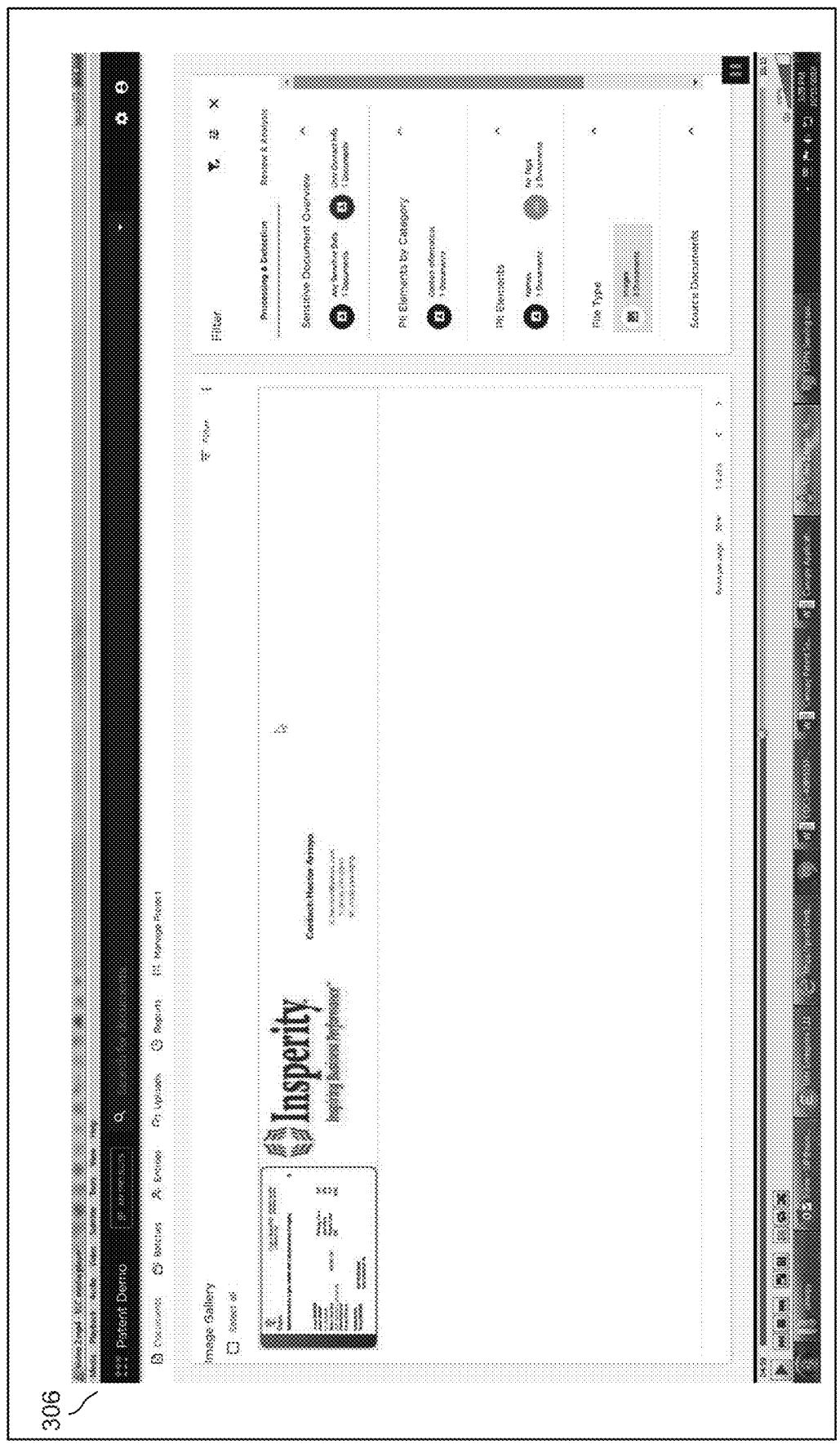

FIG. 3E shows an example of a user interface where image data present in the first data file collection is configured for display to the human reviewer in a grid view format. In an implementation, interface 300 configured as image gallery 306 can enable the human reviewer to scroll through the image gallery and select images that may comprise personal data elements, whether in the form of PII or otherwise. The human review can also classify one or more of the displayed images, and such human reviewer action can be used as feedback to train machine learning systems operational with the current data breach review project, as well as in other data breach review projects.

Figure 3F:
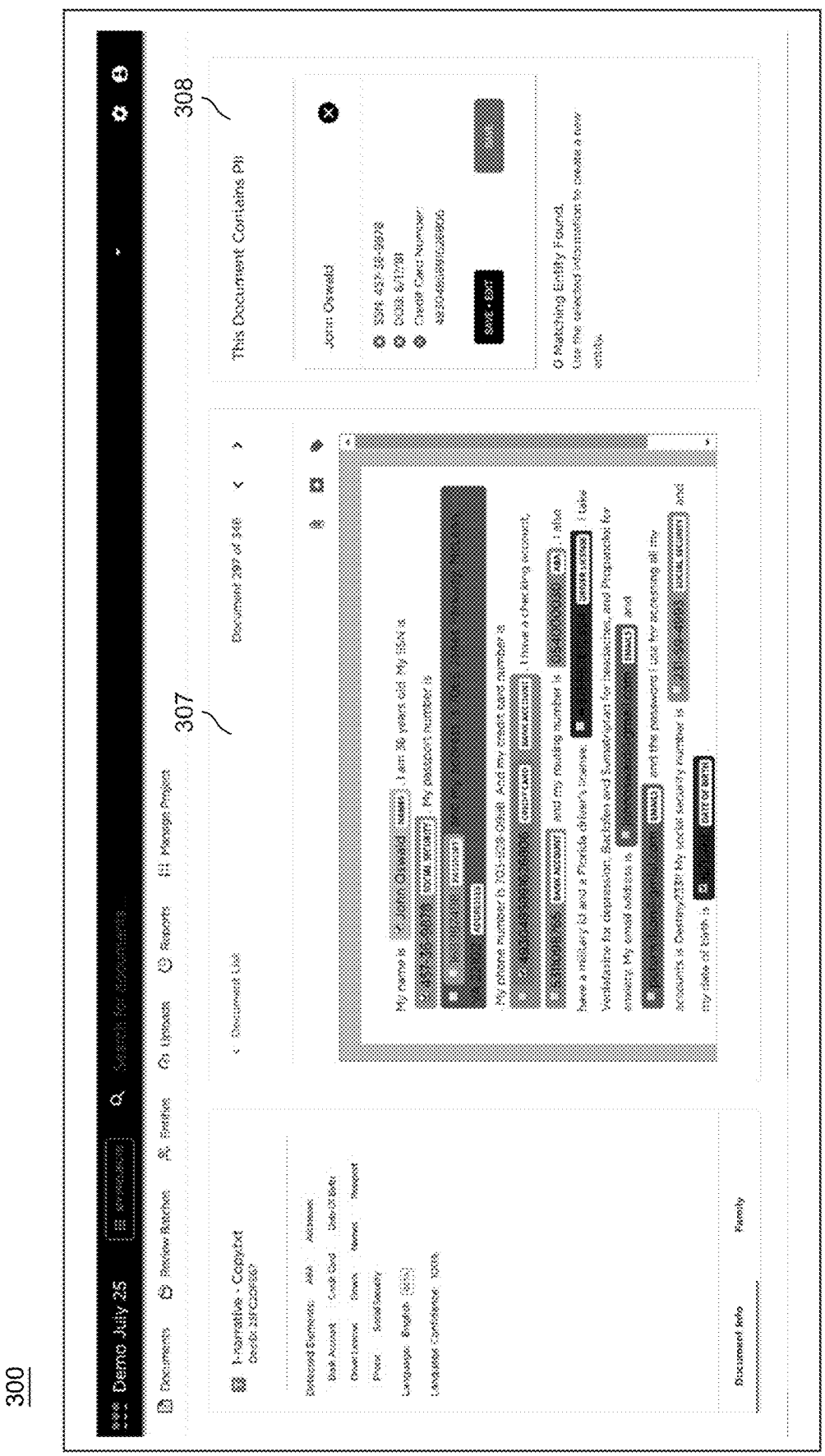

FIG. 3F shows a further example user interface 300 containing a summary view 307 which can include an "About Me" feature. In one non-limiting example, the summary view 307 may include a text narrative describing an individual/entity identified in the second data file collection together with different information associated with the individual/entity. The summary view 307 may allow the human reviewer to individually select data elements (e.g., by selecting a "checkbox" item) where such information may then be included in a profile window 308 for adding the information to an individual/entity profile. In the example shown in FIG. 3F, the selected information for "John Oswald" includes a SSN, DOB, and credit card number. This information may be added to the compliance-related database for use in compliance-related activities as discussed elsewhere herein.

Figure 3G:
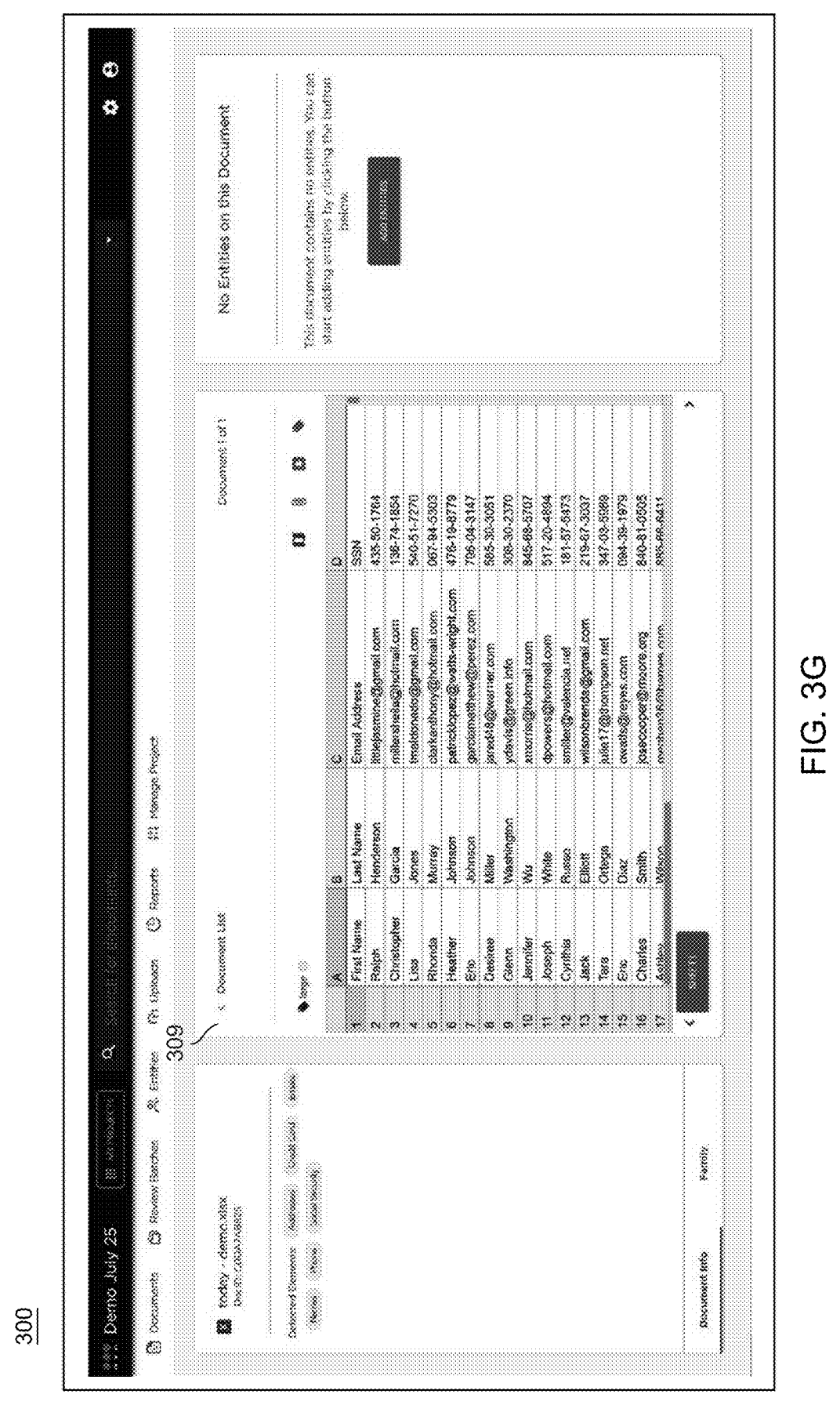
Figure 3H:
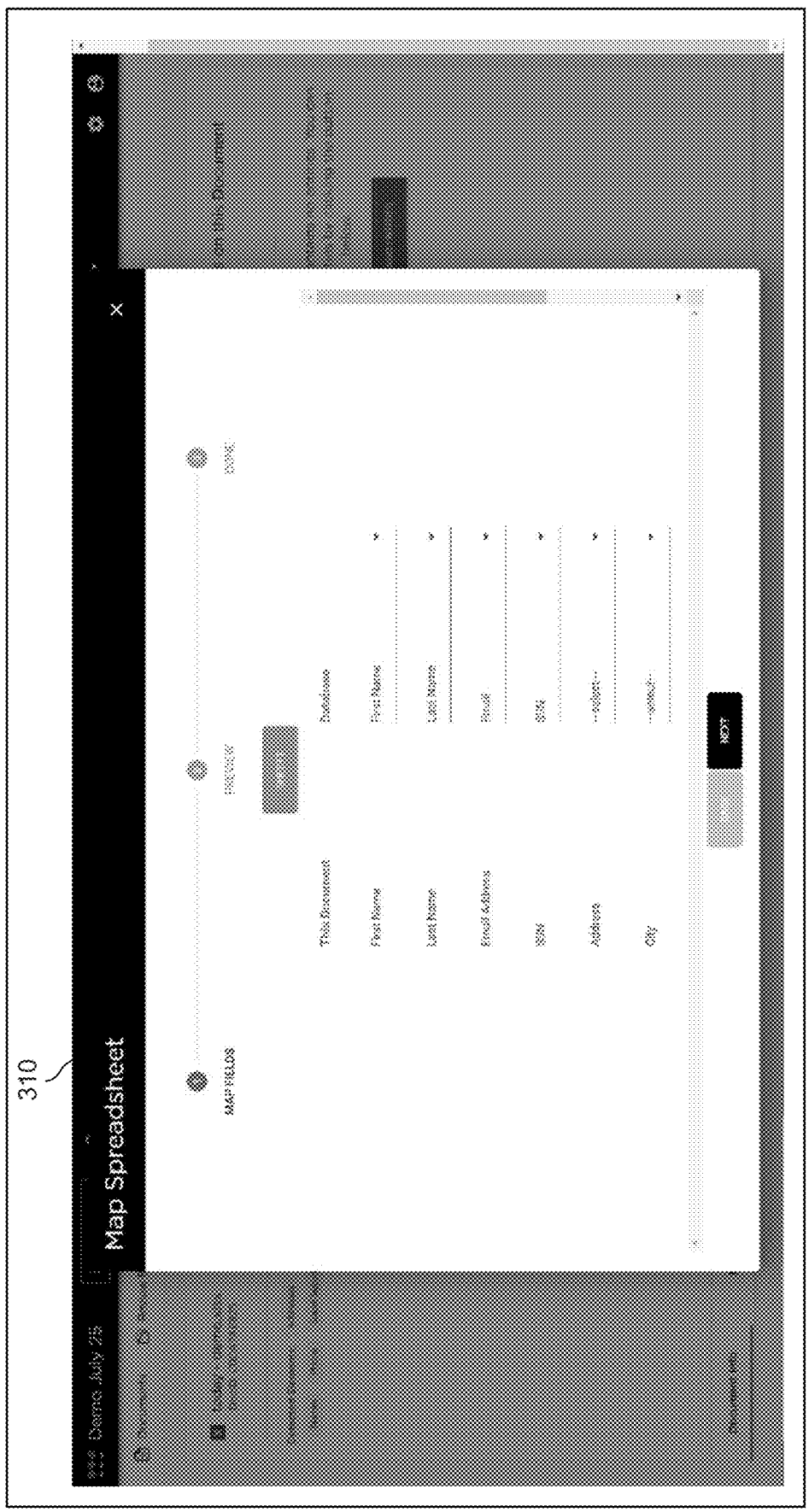
Figure 3I:
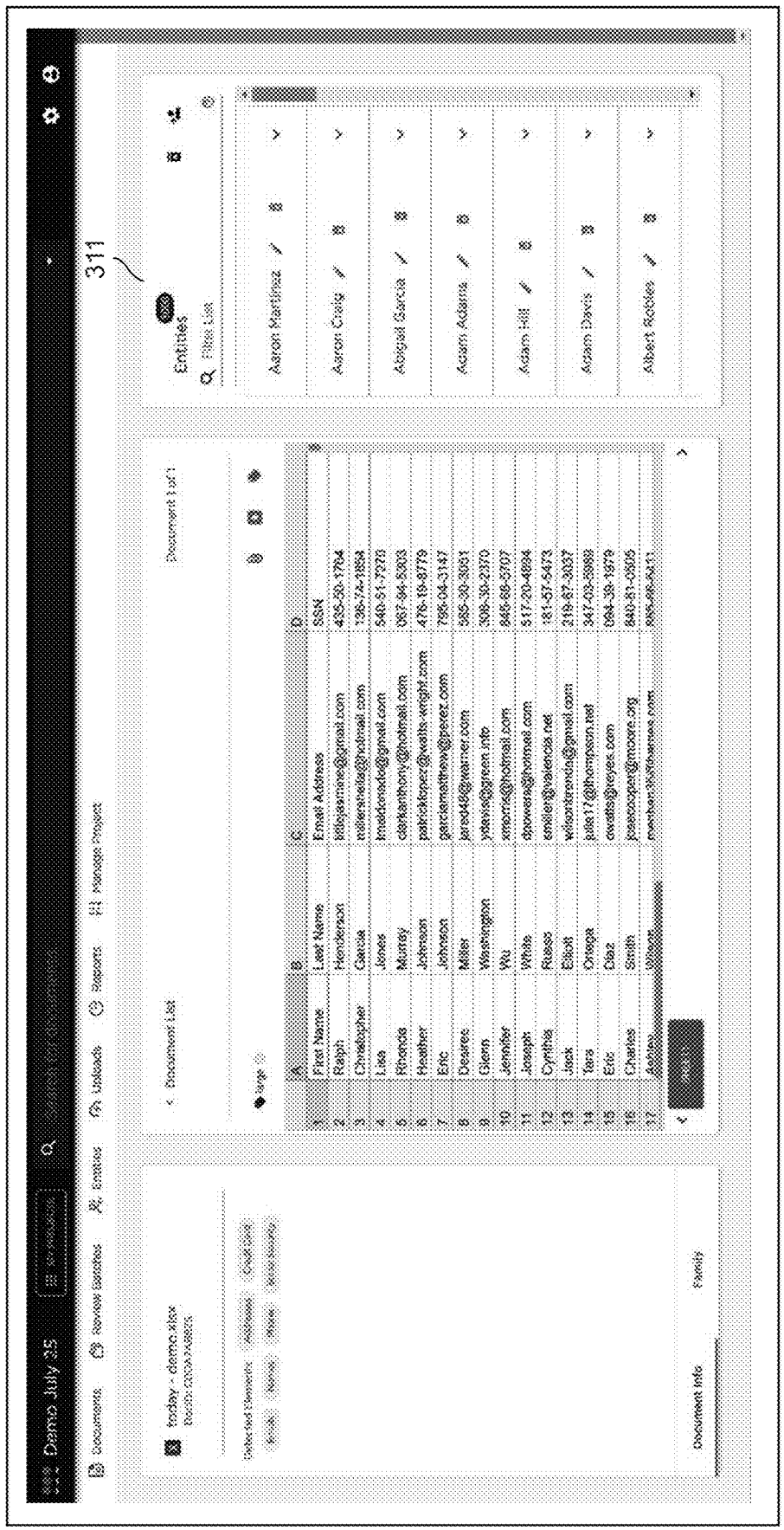

FIGS. 3G-3I show another non-limiting example user interfaces 300 related to a feature that allows a plurality of information to be populated in a compliance-related database without human reviewer action on each entry, which can enhance the speed and accuracy of database preparation when such data file types are part of the data file collections. FIG. 3G specifically shows a user interface 300 including a spreadsheet view 309 that includes various columns for different fields associated with different entries where each row includes the specific entries. In the example shown in FIG. 3G, fields "First Name," "Last Name," "Email Address," and "SSN" are depicted as columns in the spreadsheet view 309, where the associated elements are populated in each of the individual rows.

FIG. 3H shows a non-limiting example user interface 300 after a human reviewer selected a "map icon" in the interface 300 shown in FIG. 3G. FIG. 3H specifically shows a map view 310 where a human reviewer can map different fields from the spreadsheet view 309 to fields stored in a compliance-related database. In the example shown in FIG. 3G, the human reviewer has selected "First Name" in the spreadsheet view 309 to map to "First Name" in the compliance-related database. Likewise, the human reviewer has selected other various fields such as "Last Name," "Email Address," and "SSN" in the spreadsheet view 309 to fields of the same name in the compliance-related database.

FIG. 3I shows another non-limiting example user interface 300 when the fields have been mapped in the process shown in FIG. 3H. The user interface 300 in FIG. 3I is similar to that shown in FIG. 3G, but now the entity list window 311 is populated with different entities/individuals mapped into the compliance-related database. The entity list window 311 shows the entity first and last names and such information can be expanded based on additional user input. It should be appreciated that an "ActiveLookahead" feature can take the information entered by a human reviewer on one data file, and use it to look across all other data files in the data file set to see if that combination of information appears in one or more other data files. If it does, the relevant information can be automatically extracted from the data file and added to the database. This feature can substantially reduce the manual effort required by the human reviewer, as would be appreciated.

Figure 3J:
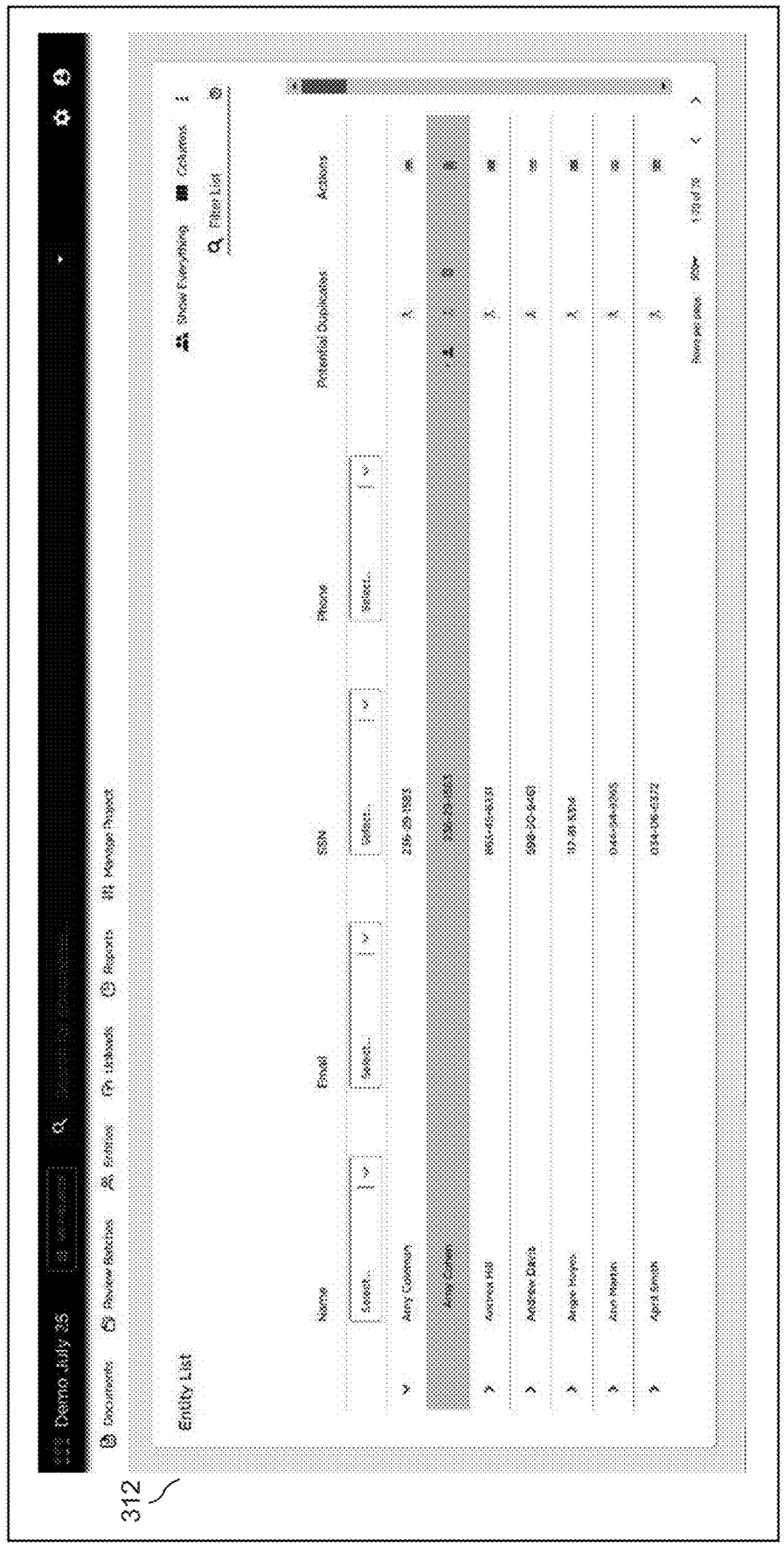
Figure 3K:
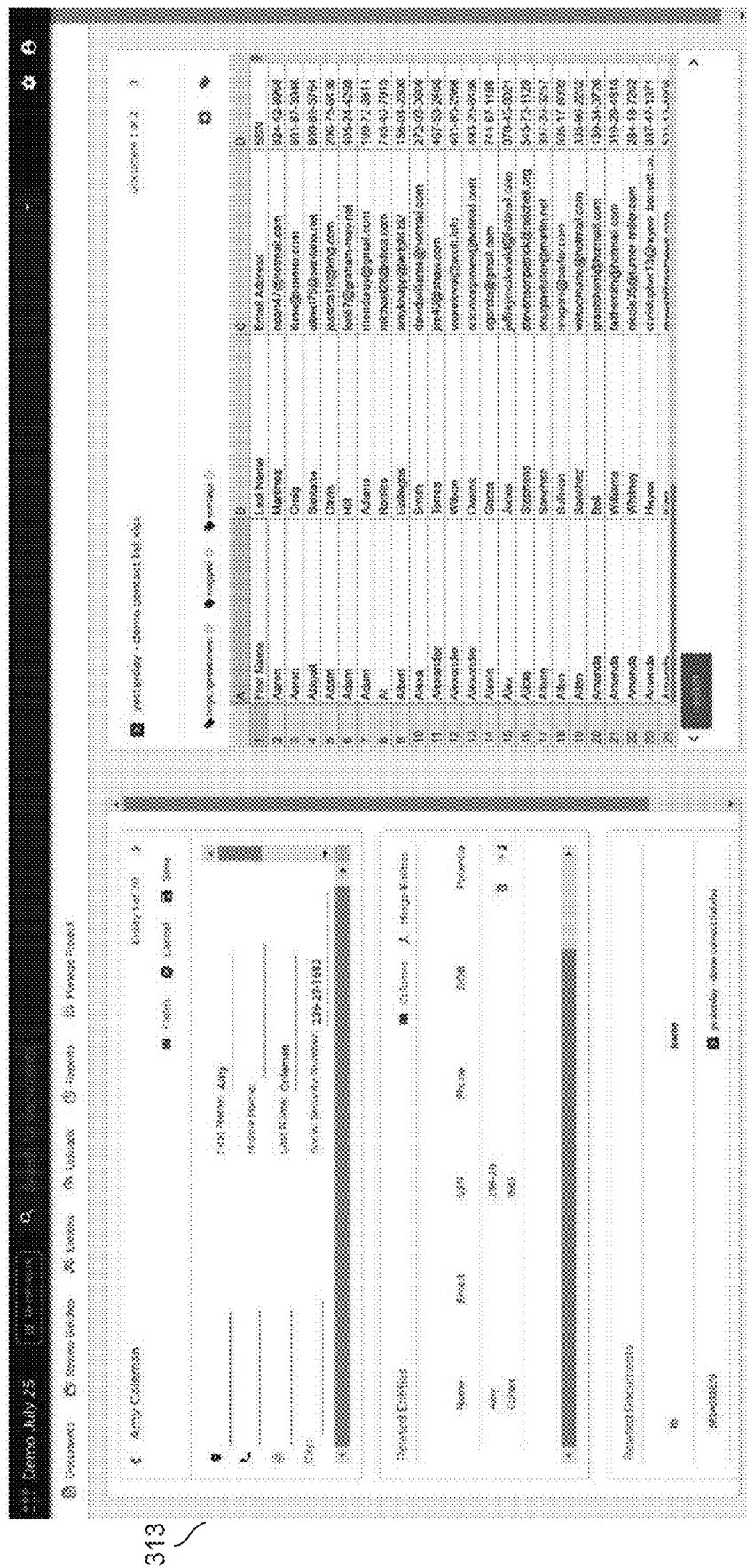

FIGS. 3J and 3K show further non-limiting example user interfaces 300 for performing the "clean-up" process. FIG. 3J specifically shows an expanded entity list window 312 showing different entities with associated information. The expanded entity list window 312 could correspond to entity list window 311 but with greater amounts of information displayed. In the example shown in FIG. 3J, the expanded entity list window 312 shows records having possible related entities. Specifically, the example of FIG. 3J shows two records for "Amy Coleman" and "Amy Cohen," respectively that appear to have the same SSN. The system is configurable to merge these related records into a single record (e.g., automatically or through human reviewer intervention). During the merge process, a human reviewer may select which information to keep and/or discard in the merge process.

FIG. 3K shows an example user interface 300 where human reviewers can view further information of the related entities. For example, FIG. 3K shows a related entities window 313 showing a specific entity as well as a record that may be related. In the example shown in FIG. 3K, the specific entity is "Amy Coleman" while the related entity "Amy Cohen" is shown with corresponding details. The human reviewer may then decide whether to merge and/or discard one or more related entities (as well as the specific details for the related entity). The system can be configured with machine learning systems that learn from the human reviewer selections in order to enhance the process for merging entities during the current review, as well as that of other reviews for different data breach event process.

Figure 3L:
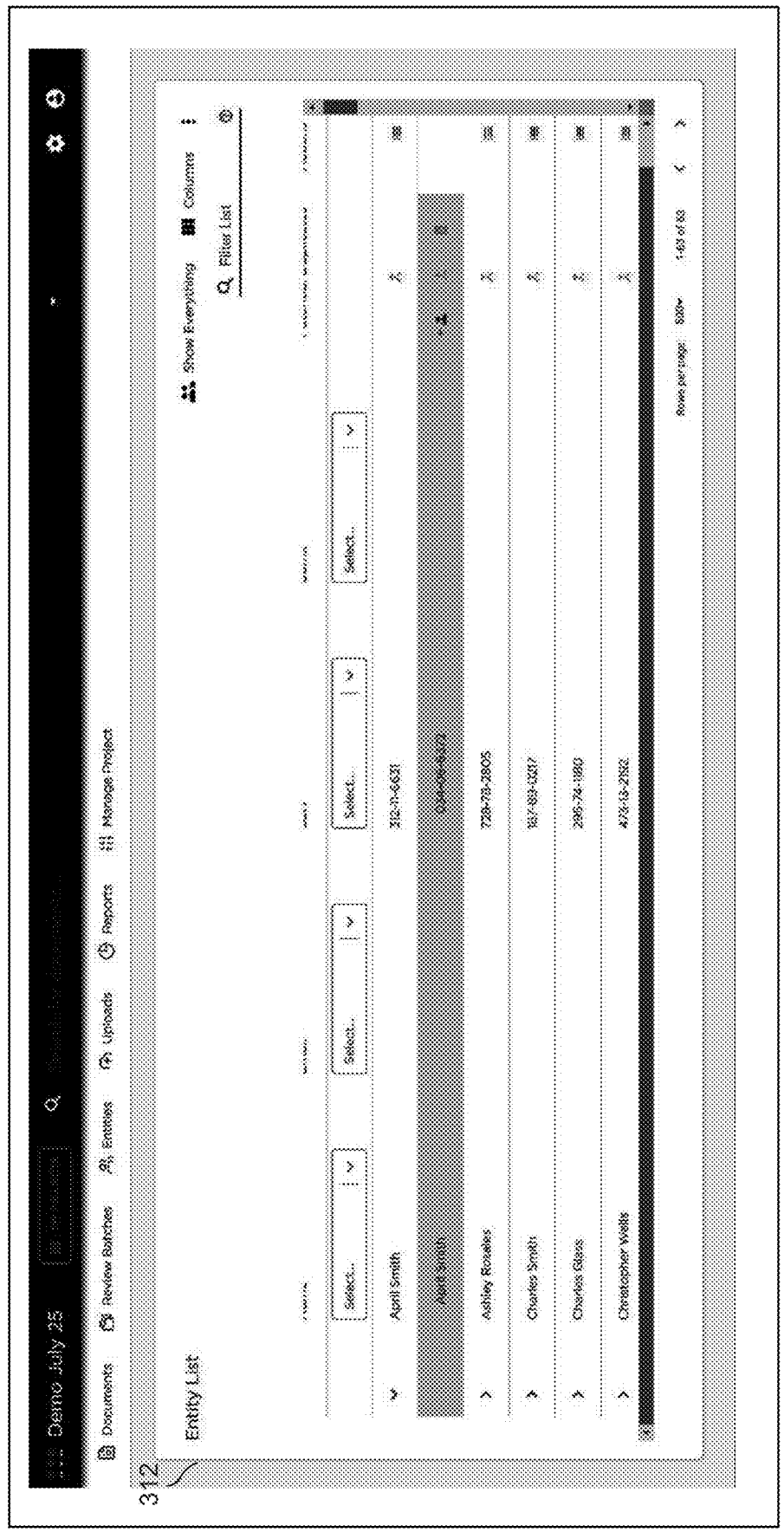

FIG. 3L shows an example user interface 300 with an example situation for anomaly detection. In the example of FIG. 3L, the expanded entity list window 312 shows "April Smith" having two different SSNs. This could indicate two individuals with the same name, or the same individual erroneously associated with a wrong SSN. Anomaly detection can "flag" this entity identification and provide a notification to the human reviewer of a recommended selection based on all the available information. When the human reviewer makes a decision, the system can record that decision for future selection options. For example, if April Smith and April Myers are the same person, as determined by a human reviewer, the system can remember that in future cases when the same April Smith and April Myers are found (based on the additional identifying information). For example, the system can be configured to use the previous human reviewer and system actions to determine which last name to keep among other information.

FIG. 3M shows a further example of user interface 300 having checklists 314. For several of the checkboxes in checklists 314, the human reviewer does not select for storing the information as they would for a piece of fielded information (e.g., shown on the rightmost image). When the human reviewer selects these boxes, the provides the ability to learn what information the human reviewer is interested in, upon which the system can then use within context to train various machine learning models to detect that additional information in the data file that has not yet been reviewed by a human reviewer.

FIG. 4 shows block diagram illustrating an example of a hardware architecture for the system 1260. In the example shown in FIG. 4, the client device 1210 communicates with a server system 1200 via a network 1240. The network 1240 can comprise a network of interconnected computing devices, such as the internet. The network 1240 can also comprise a local area network (LAN) or a peer-to-peer connection between the client device 1210 and the server system 1200. The hardware elements shown in FIG. 4 can be used to implement the various software components and actions shown and described above as being included in and/or executed at the client device 1210 and server system 1200.

In some implementations, the client device 1210 (which may also be referred to as a "client system" herein) can include one or more of the following: one or more processors 1212; one or more memory devices 1214; one or more network interface devices 1216; one or more display interfaces 1218; and one or more user input adapters 1220. Additionally, in some implementations, the client device 1210 can be connected to or includes a display device 1222. These elements (e.g., the processors 1212, memory devices 1214, network interface devices 1216, display interfaces 1218, user input adapters 1220, display device 1222) are hardware devices (for example, electronic circuits or combinations of circuits) that are configured to perform various different functions for the computing device 1210.

In some implementations, each or any of the processors 1212 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some implementations, each or any of the processors 1212 uses an instruction set architecture such as x86 or Advanced RISC Machine (ARM).

In some implementations, each or any of the memory devices 1214 can comprise a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1212). Memory devices 1214 are examples of non-volatile computer-readable storage media.

In some implementations, each or any of the network interface devices 1216 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some implementations, the transmitter and receiver of a transceiver may not share any common circuitry and/or may be in the same or separate housings.

In some implementations, each or any of the display interfaces 1218 can comprise one or more circuits that receive data from the processors 1212 or processing circuitry, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1222, which displays the image data. Alternatively or additionally, in some implementations, each or any of the display interfaces 1218 can comprise, for example, a video card, video adapter, or graphics processing unit (GPU).

In some implementations, each or any of the user input adapters 1220 is or includes one or more circuits that receive and process user input data from one or more user input devices (not shown in FIG. 4) that are included in, attached to, or otherwise in communication with the client device 1210, and that output data based on the received input data to the processors 1212. Alternatively or additionally, in some implementations each or any of the user input adapters 1220 is or includes, for example, a PS/2 interface, a USB interface, a touchscreen controller, or the like; and/or the user input adapters 1220 facilitates input from user input devices (not shown in FIG. 7) such as, for example, a keyboard, mouse, trackpad, touchscreen, etc.

In some implementations, the display device 1222 may be a Liquid Crystal Display (LCD) display, Light Emitting Diode (LED) display, or other type of display device. In implementations where the display device 1222 is a component of the client device 1210 (e.g., the computing device and the display device are included in a unified housing), the display device 1222 may be a touchscreen display or non-touchscreen display. In implementations where the display device 1222 is connected to the client device 1210 (e.g., is external to the client device 1210 and communicates with the client device 1210 via a wire and/or via wireless communication technology), the display device 1222 can be, for example, an external monitor, projector, television, display screen, etc.

In various implementations, the client device 1210 includes one, or two, or three, four, or more of each or any of the above-mentioned elements (e.g., the processors 1212, memory devices 1214, network interface devices 1216, display interfaces 1218, and user input adapters 1220). Alternatively or additionally, in some implementations, the client device 1210 includes one or more of: a processing system that includes the processors 1212; a memory or storage system that includes the memory devices 1214; and a network interface system that includes the network interface devices 1216.

The client device 1210 may be arranged, in various implementations, in many different ways. As just one example, the client device 1210 may be arranged such that the processors 1212 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the client device 1210 may be arranged such that: the processors 1212 include two, three, four, five, or more multi-core processors; the network interface devices 1216 include a first network interface device that implements Ethernet and a second network interface device that implements WiFi and/or Bluetooth; and the memory devices 1214 include a RAM and a flash memory or hard disk.

Server system 1200 also comprises various hardware components used to implement the software elements for server system 200 of FIG. 2. In some implementations, the server system 1200 (which may also be referred to as "server device" herein) includes one or more of the following: one or more processors 1202; one or more memory devices 1204; and one or more network interface devices 1206. These elements (e.g., the processors 1202, memory devices 1204, network interface devices 1206) are hardware devices (for example, electronic circuits or combinations of circuits) that are configured to perform various different functions for the server system 1200. In other implementations, the server system 1200 can comprise one or more computers or other computing devices.

In some implementations, each or any of the processors 1202 can comprise, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some implementations, each or any of the processors 1202 uses an instruction set architecture such as x86 or Advanced RISC Machine (ARM).

In some implementations, each or any of the memory devices 1204 can comprise a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1202). Memory devices 1204 are examples of non-volatile computer-readable storage media.

In some implementations, each or any of the network interface devices 1206 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some implementations, the transmitter and receiver of a transceiver may not share any common circuitry and/or may be in the same or separate housings.

In various implementations, the server system 1200 includes one, or two, or three, four, or more of each or any of the above-mentioned elements (e.g., the processors 1202, memory devices 1204, network interface devices 1206). Alternatively or additionally, in some implementations, the server system 1200 includes one or more of a processing system that includes the processors 1202; a memory or storage system that includes the memory devices 1204; and a network interface system that includes the network interface devices 1206.

The server system 1200 may be arranged, in various implementations, in many different ways. As just one example, the server system 1200 may be arranged such that the processors 1202 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the server system 1200 may be arranged such that: the processors 1202 include two, three, four, five, or more multi-core processors; the network interface devices 1206 include a first network interface device that implements Ethernet and a second network interface device that implements WiFi and/or Bluetooth; and the memory devices 1204 include a RAM and a flash memory or hard disk.

It should be noted that, when a software module, application or software process performs any action, the action is in actuality performed by underlying hardware elements according to the instructions that comprise the software module. Consistent with the foregoing, in various implementations, each or any combination of the client device 1210 or the server system 1200, each of which will be referred to individually for clarity as a "component" for the remainder of this paragraph, are implemented using an example of the client device 1210 or the server system 1200 of FIG. 4. In such implementations, the following applies for each component (a) the elements of the client device 1210 shown in FIG. 4 (i.e., the one or more processors 1212, one or more memory devices 1214, one or more network interface devices 1216, one or more display interfaces 1218, and one or more user input adapters 1220) and the elements of the server system 1200 (i.e., the one or more processors 1202, one or more memory devices 1204, one or more network interface devices 1206), or appropriate combinations or subsets of the foregoing, are configured to, adapted to, and/or programmed to implement each or any combination of the actions, activities, or features described herein as performed by the component and/or by any software modules described herein as included within the component; (b) alternatively or additionally, to the extent it is described herein that one or more applications or software modules exist within the component, in some implementations, such applications or software modules (as well as any data described herein as handled and/or used by the applications or software modules) can be stored in the respective memory devices (e.g., in various implementations, in a volatile memory device such as a RAM or an instruction register and/or in a non-volatile memory device such as a flash memory or hard disk) and all actions described herein as performed by the software modules are performed by the respective processors in conjunction with, as appropriate, the other elements in and/or connected to the client device 1210 or server system 1200; (c) alternatively or additionally, to the extent it is described herein that the component processes and/or otherwise handles data, in some implementations, such data can be stored in the respective memory devices (e.g., in some implementations, in a volatile memory device such as a RAM and/or in a non-volatile memory device such as a flash memory or hard disk) and/or is processed/handled by the respective processors in conjunction, as appropriate, the other elements in and/or connected to the client device 1210 or server system 1200; (d) alternatively or additionally, in some implementations, the respective memory devices store instructions that, when executed by the respective processors, cause the processors to perform, in conjunction with, as appropriate, the other elements in and/or connected to the client device 1210 or server system 1200, each or any combination of actions described herein as performed by the component and/or by any software modules described herein as included within the component.

Any logic, application or software module described herein that comprises software or instructions can be embodied in any non-transitory computer-readable medium for use by or in connection with an instruction execution system such as, for example, a processor 1202 in a computer system or other system. In this sense, the logic may comprise, for example, statements including instructions and declarations that can be fetched from the computer-readable medium and executed by the instruction execution system. The flowcharts or diagrams of FIGS. 1A and 1B show examples of the architecture, functionality, and operation of possible implementations of an information extraction and analysis application. In this regard, each block can represent a module, segment, or portion of code, which comprises one or more executable instructions for implementing the specified logical function(s). It should also be noted that in some alternative implementations, the functions noted in the blocks may occur out of the order noted in FIGS. 1A and 1B. For example, two blocks shown in succession in FIGS. 1A and 1B may in fact be executed substantially concurrently or the blocks may sometimes be executed in a different or reverse order, depending upon the functionality involved. Alternate implementations are included within the scope of the preferred implementation of the present disclosure in which functions may be executed out of order from that shown or discussed, including substantially concurrently or in reverse order, depending on the functionality involved, as would be understood by those reasonably skilled in the art of the present disclosure.

The hardware configurations shown in FIG. 4 and described above are provided as examples, and the subject matter described herein may be utilized in conjunction with a variety of different hardware architectures and elements. For example: in many of the Figures in this document, individual functional/action blocks are shown; in various implementations, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 4, (e) via other hardware arrangements, architectures, and configurations, and/or via com73binations of the technology described in (a) through (e).

As described herein, the exemplary aspects have been described and illustrated in the drawings and the specification. The exemplary aspects were chosen and described in order to explain certain principles of the invention and their practical application, to thereby enable others skilled in the art to make and utilize various exemplary aspects of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of managing compliance-related activities after a data breach associated with an enterprise IT network comprising:
  a. receiving, by at least one computer, a first data file collection associated with a first data breach event wherein:
    i. the first data file collection is:
      1. generated by analysis of the first data breach event and derived from a bulk data file collection stored on or associated with a first enterprise IT network of interest for monitoring for an occurrence of data breach events;
    ii. the first data file collection comprises at least some of structured, unstructured, and semi-structured data file types; and
    iii. at least some of the first data file collection comprises protected information having compliance-related activities associated therewith;
  b. generating, by the at least one computer, information associated with presence or absence of protected information elements of all or part of the first data file collection and, if the generated information indicates that a data file in the first data file collection includes the protected information elements, incorporating that data file in a second data file collection;
  c. analyzing, by at least one human reviewer, a subset of individual data files selected from the second data file collection to validate that each data file in the subset of individual data files comprises one or more of the protected information elements, wherein:
    i. if it is determined that the one or more protected information elements are not present in a data file, removing, by the at least one human reviewer, that data file from the second data file collection and re-incorporating that data file into the first data file collection; or
    ii. if it is determined that the one or more protected information elements are present in a data file:
      1. deriving, by either or both of the at least one human reviewer or the at least one computer, at least one entity identification for an entity associated with each of the one or more protected information elements in that data file, wherein the entity comprises an individual, a group of individuals, an organization, or a company; and
      2. generating, by either or both of the at least one human reviewer or the at least one computer, information associated with each of the one or more protected information elements and the associated entity; and
  d. incorporating, by the at least one computer, the information associated with the analysis of the subset of individual data files into machine learning information configured for subsequent analysis of either or both of the first and second data file collections.

2. The method of claim 1, wherein the unstructured data file type in the first data file collection comprises image files.

3. The method of claim 2, further comprising:
  a. selecting, by the at least one computer, a subset of image files from either or both of the first and second data file collections;
  b. configuring, by the at least one computer, the subset of image files for display and selection on a user device associated with the at least one human reviewer;
  c. displaying, by the at least one computer, a plurality of the image files from the subset of image files on the user device;
  d. selecting, by the at least one human reviewer, a displayed image when the at least one human reviewer identifies that the displayed image is associated with the one or more protected information elements; and
  e. recording, by the at least one computer, information associated with the at least one human reviewer's selection of the displayed image, thereby providing identification information for the presence or absence of the one or more protected information elements in at least some image files in the subset of image files selected from either or both of the first and second data file collections.

4. The method of claim 3, further comprising:
   a. incorporating, by the at least one computer, the identification information into machine learning training information; and
   b. analyzing, by the at least one computer, image files in the first and second data file collections for the presence of the one or more protected information elements.

5. The method of claim 3, further comprising:
   a. identifying, by the at least one computer, some or all of the one or more protected information elements and the at least one entity identification in the image files; and
   b. extracting, by the at least one computer, the identified protected information elements and the at least one entity identification from the image files for incorporation in a database.

6. The method of claim 1, further comprising:
   a. recording, by the at least one computer, information associated with the analysis by the at least one human reviewer of each of the subset of individual data files in the second collection of data files; and
   b. incorporating, by the at least one computer, the at least one human reviewer's analysis information as training information for use in subsequent analysis of one or more of:
      i. data files in the first data file collection;
      ii. data files in the second data file collection that are not included in the subset of individual data files;
      iii. data files in the subset of individual data files that have not yet been reviewed by the at least one human reviewer;
      iv. a third data file collection derived from a bulk data file collection stored on or associated with the first enterprise IT network, wherein the third data file collection is generated after a second data breach event associated with the first enterprise IT network; or
      v. a fourth data file collection derived from a bulk data file collection stored on or associated with a second enterprise IT network that is different from the first enterprise IT network, wherein the fourth data file collection is generated after a data breach event occurring on the second enterprise IT network.

7. The method of claim 1, further comprising:
   a. determining, by the at least one computer, whether one or more second collection data files of the second data file collection are associated with the at least one identified entity and, if other second collection data files are associated with that identified entity, generating linkages between the entity-associated files, thereby providing a linked data file collection linked with one or more entity identifications having the one or more protected information elements associated therewith.

8. The method of claim 1, wherein each of the second data file collection is arranged for display and selection on a display device associated with the at least one human reviewer as one or more of:
   a. a plurality of defined categories of the protected information elements;
   b. a count of data files comprising the protected information elements; and
   c. a count of data file categories comprising the protected information elements.

9. The method of claim 1, further comprising:
   a. displaying, by the at least one computer, text summaries extracted from a data file in the second data file collection on a device display of the at least one human reviewer, wherein:
      i. the displayed text summaries comprise each of a protected information element and an entity identification in the data file;
      ii. the text summaries are each provided on the device display with highlighting generated by the at least one computer; and
      iii. the text summaries are configured to allow the at least one human reviewer to select all or part of each of the protected information element and entity identification;
   b. selecting, by the at least one human reviewer, some or all of the highlighted protected information elements and entity identifications, thereby providing human reviewer validation of the protected information elements and entity identifications in the data file; and
   c. adding, by the at least one computer, the selected protected information elements and entity identifications to a database.

10. The method of claim 1, wherein when the second data file collection is identified by either or both of the at least one human reviewer or the at least one computer as comprising a plurality of protected information elements associated with one or more entity identifications, each of the plurality of protected information elements is linked to each of the one or more entity identifications.

11. The method of claim 1, wherein the second data file collection comprises an unstructured data file and the plurality of protected information data elements associated with the one or more entity identifications are included as tabular data in the unstructured data file.

12. The method of claim 1, wherein the identification of protected information in the first data file collection is associated with a generated confidence level, and wherein when a determination that a data file in the first data file collection meets or exceeds the generated confidence level, that data file is included in the second data file collection.

13. The method of claim 1, wherein the compliance-related activities are defined by one or more of laws, regulations, policies, procedures, and contractual obligations associated with the protected information.

14. The method of claim 13, wherein the compliance-related activities comprise one or more of:
   a. notifying, by the at least one computer or by a manager of the first enterprise IT network, each identified entity of the protected information associated with that entity that was involved with the first data breach event; and
   b. notifying, by the at least one computer or the first enterprise IT network manager, a regulatory authority of the first network breach event and providing the regulatory authority with information associated with the identified entities having the protected information involved in the first data breach event.

15. A method of managing compliance-related activities after a data breach associated with an enterprise IT network comprising:
   a. providing, by at least one computer, a machine learning library generated by the method of:
      i. receiving, by the at least one computer, a first data file collection associated with a first data breach event wherein:
         1. the first data file collection is:
            a. generated by analysis of the first data breach event and derived from a bulk data file collection stored on or associated with a first enterprise IT network of interest for monitoring for an occurrence of data breach events;

b. the first data file collection comprises at least some of structured, unstructured, and semi-structured data file types; and
c. at least some of the first data file collection comprises protected information having compliance-related activities associated therewith;

ii. generating, by the at least one computer, information associated with presence or absence of protected information elements of all or part of the first data file collection and, if the generated information indicates that a data file in the first data file collection includes the protected information elements, incorporating that data file in a second data file collection;

iii. analyzing, by at least one human reviewer, a subset of individual data files selected from the second data file collection to validate that each data file in the subset of individual data files comprises one or more of the protected information elements, wherein:
  1. if it is determined that the one or more protected information elements are not present in a data file, removing, by the at least one human reviewer, that data file from the second data file collection and re-incorporating that data file into the first data file collection; or
  2. if it is determined that the one or more protected information elements are present in a data file:
    a. deriving, by either or both of the at least one human reviewer or the at least one computer, at least one entity identification for an entity associated with each of the one or more protected information elements in that data file, wherein the entity comprises an individual, a group of individuals, an organization, or a company; and
    b. generating, by either or both of the at least one human reviewer or the at least one computer, information associated with each of the one or more protected information elements and the associated entity; and iv. incorporating, by the at least one computer, the information associated with the analysis of the subset of individual data files into machine learning information configured for subsequent analysis of either or both of the first and second data file collections, the machine learning information stored in the machine learning library;

b. receiving, by the at least one computer, a third data file collection associated with a second data breach event; and c. analyzing, by the at least one computer, the data files in the third data file collection to generate a compliance-related database configured for providing notifications associated with the second data breach event.

16. The method of claim 15, further comprising:
a. incorporating at least some human reviewer analysis with the third data file collection analysis.

17. The method of claim 15, wherein the third data file collection analysis includes identification of the presence or absence of protected information elements in the data files.

18. The method of claim 17, wherein at least some of the data files in the third data file collection comprise one or more protected information elements, and the method further comprises:
a. linking, by the at least one computer, some or all of the one or more protected information elements with at least one entity, thereby generating entity identification information linkage information for at least some of the protected information elements in the data files.

19. The method of claim 18, wherein at least some of the data files in the third data file collection comprise image files.

20. The method of claim 15, wherein the third data file collection comprises at least some unstructured data files and a plurality of protected information elements associated with the one or more entity identifications are included as tabular data in the unstructured data file.

21. The method of claim 15, wherein the compliance-related activities are defined by one or more of laws, regulations, policies, procedures, and contractual obligations associated with the protected information.

* * * * *